US011035428B2

(12) United States Patent
Hoshino

(10) Patent No.: US 11,035,428 B2
(45) Date of Patent: Jun. 15, 2021

(54) WET FRICTION MATERIAL

(71) Applicant: AISIN KAKO KABUSHIKI KAISHA, Toyota (JP)

(72) Inventor: Ryohei Hoshino, Toyota (JP)

(73) Assignee: AISIN KAKO KABUSHIKI KAISHA, Toyota (JP)

( * ) Notice: Subject to any disclaimer, the term of this patent is extended or adjusted under 35 U.S.C. 154(b) by 221 days.

(21) Appl. No.: 16/318,312

(22) PCT Filed: May 17, 2017

(86) PCT No.: PCT/JP2017/018589
§ 371 (c)(1),
(2) Date: Jan. 16, 2019

(87) PCT Pub. No.: WO2018/047414
PCT Pub. Date: Mar. 15, 2018

(65) Prior Publication Data
US 2019/0249737 A1      Aug. 15, 2019

(30) Foreign Application Priority Data

Sep. 8, 2016   (JP) .............................. JP2016-175933

(51) Int. Cl.
*F16D 13/64*      (2006.01)
*F16D 69/00*      (2006.01)
(Continued)

(52) U.S. Cl.
CPC ............. *F16D 69/00* (2013.01); *F16D 13/64* (2013.01); *F16D 13/72* (2013.01); *F16D 13/74* (2013.01);
(Continued)

(58) Field of Classification Search
CPC ........ F16D 13/60; F16D 13/648; F16D 13/72; F16D 13/74; F16D 69/0416;
(Continued)

(56) References Cited

U.S. PATENT DOCUMENTS 5,460,255 A  * 10/1995  Quigley ................ F16D 13/648
                                                              192/113.36
9,139,167 B2 *  9/2015  Tokumasu .............. B60T 1/065
(Continued)

FOREIGN PATENT DOCUMENTS

| CN | 101398051 A | 4/2009 |
|----|-------------|--------|
| CN | 102498308 A | 6/2012 |

(Continued)

OTHER PUBLICATIONS

Combined Office Action and Search Report dated Jun. 20, 2019 in Chinese Patent Application No. 201780050177.4, 11 pages (with English translation and English translation of categories of cited documents).

(Continued)

*Primary Examiner* — Christopher P Schwartz
(74) *Attorney, Agent, or Firm* — Oblon, McClelland, Maier & Neustadt, L.L.P.

(57) ABSTRACT

A present wet friction body includes a core plate, a plurality of friction parts disposed on a main surface thereof in a ring shape at intervals, a plurality of oil grooves defined by the corresponding friction parts. The friction parts include first to third friction parts in which forms of the pair of sidewalls are different each other. The first friction part includes a left sidewall inclining to the right and a right sidewall inclining to the left, with respect to an imaginary line segment, and an outer peripheral wall having a length less than a length of an inner peripheral wall. The second friction part includes a pair of sidewalls, both inclining to the right with respect to (Continued)

an imaginary line segment. The third friction part includes a pair of sidewalls, both inclining to the left with respect to an imaginary line segment.

6 Claims, 8 Drawing Sheets

(51) Int. Cl.
    *F16D 13/74* (2006.01)
    *F16D 13/72* (2006.01)
    *F16D 65/092* (2006.01)
    *F16D 65/12* (2006.01)

(52) U.S. Cl.
    CPC ......... *F16D 65/092* (2013.01); *F16D 65/127* (2013.01); *F16D 65/128* (2013.01); *F16D 2069/004* (2013.01)

(58) Field of Classification Search
    CPC ......... F16D 69/0408; F16D 2069/0483; F16D 13/64; B60T 1/062; B60T 1/065
    USPC ........... 188/71.5, 71.6, 264 B, 264 D, 264 E; 192/107 R, 113.36, 107 M
    See application file for complete search history.

(56) References Cited

U.S. PATENT DOCUMENTS

| | | | | |
|---|---|---|---|---|
| 10,731,712 | B2* | 8/2020 | Ohashi | ................. F16D 13/648 |
| 2004/0154735 | A1* | 8/2004 | Oguri | .................... B23P 15/00 |
| | | | | 156/250 |
| 2006/0090980 | A1* | 5/2006 | Kinoshita | ............ F16D 13/648 |
| | | | | 192/113.36 |
| 2009/0050434 | A1* | 2/2009 | Okamura | ............... F16D 13/648 |
| | | | | 192/113.36 |
| 2009/0053475 | A1 | 2/2009 | Higashijima et al. | |
| 2012/0175216 | A1* | 7/2012 | Hiramatsu | ........... F16D 13/648 |
| | | | | 192/107 R |
| 2012/0298463 | A1* | 11/2012 | Tokumasu | .............. F16D 13/72 |
| | | | | 192/66.3 |
| 2013/0032271 | A1* | 2/2013 | Reiners | ................... F16D 13/64 |
| | | | | 156/60 |
| 2013/0168199 | A1 | 7/2013 | Higashijima et al. | |
| 2014/0110199 | A1 | 4/2014 | Tokumasu et al. | |

FOREIGN PATENT DOCUMENTS

| | | |
|---|---|---|
| CN | 102822549 A | 12/2012 |
| CN | 102996664 A | 3/2013 |
| CN | 103429923 A | 12/2013 |
| CN | 103939491 A | 7/2014 |
| JP | 2001-295859 A | 10/2001 |
| JP | 2004-76896 A | 3/2004 |
| JP | 2005-265186 A | 9/2005 |
| JP | 3935024 B2 | 6/2007 |
| WO | WO 2012/147539 A1 | 11/2012 |

OTHER PUBLICATIONS

International Search Report dated Aug. 15, 2017 in PCT/JP2017/018589 filed May 17, 2017.

* cited by examiner

WET FRICTION MATERIAL

TECHNICAL FIELD

The present invention relates to a wet friction body. More specifically, the present invention relates to a wet friction body that is used under presence of oil and that can be incorporated in a wet clutch, a wet brake, or the like.

BACKGROUND ART

Conventionally, wet clutches and wet brakes, using wet friction bodies, are used for torque transmission, braking, and the like. For example, a wet friction body is used in a wet hydraulic clutch in an automatic transmission for an automobile or the like.

The wet hydraulic clutch has a structure in which a plurality of wet friction bodies and a plurality of separator plates are alternately disposed with a small clearance to perform transmission and non-transmission of torque by being brought into pressure contact with each other and separated from each other. Lubricating oil is supplied into the clutch to reduce friction between the wet friction bodies in the pressure contact and separation described above or to absorb frictional heat caused by the friction, for example. When the clutch is not engaged, the wet friction bodies and the separator plates are relatively rotated while being separated from each other, and it is known that torque called drag torque is generated at that time.

The drag torque described above consumes unnecessary energy when the clutch idles. For this reason, reduction of drag torque has been desired in recent years as a countermeasure for low fuel consumption, which is being rapidly advanced. There are known various approaches for reducing the drag torque. Among them, Patent Literatures 1 and 2 below each disclose a method for reducing the drag torque by modifying a shape of a friction part.

CITATIONS LIST

Patent Literatures

Patent Literature 1: Japanese Unexamined Patent Application Publication No. 2001-295859
Patent Literature 2: Japanese Unexamined Patent Application Publication No. 2005-265186

SUMMARY OF INVENTION

Technical Problems

Patent Literature 1 above discloses a wet friction body in which facing end faces of respective adjacent segment friction materials that define an oil groove are each provided with a wide portion having a wide groove width, formed by a notch in its end portion on an inner circumferential side and/or its intermediate portion. This shows that the wet friction body is excellent in heat resistance and can reduce drag torque.

Patent Literature 2 above discloses a wet friction body including an oil groove having an inner peripheral opening or an intermediate portion that expands in a bilaterally symmetrical shape, and an oil groove having a width that is almost uniform from its inner periphery opening to its outer peripheral opening, the oil grooves being mixed at a predetermined ratio. This shows that the wet friction body can reduce drag torque even in a portion having a large amount of lubricating oil, and a portion where lubricating oil is less likely to be released.

However, more various modes of reducing drag torque are required as a countermeasure for low fuel consumption desired strongly in recent years as previously discussed.

The present invention is made in light of the problem described above, and an object thereof is to provide a wet friction body that achieves reduction of drag torque with a structure different from the conventional structures.

Solutions to Problems

The present invention is as follows.

A wet friction body according to a first aspect of the present invention includes a core plate in a flat ring shape with a center serving as a rotation center $P_0$, a plurality of friction parts disposed at intervals in a ring shape on a main surface of the core plate, and a plurality of oil grooves defined by the corresponding friction parts as the respective intervals. In plan view, the friction parts each include a pair of sidewalls composed of a left sidewall defining an oil groove positioned on a left side of the friction portion and a right sidewall defining an oil groove positioned on a right side of the friction portion, an outer peripheral wall connecting the pair of sidewalls on an outer peripheral side thereof, and an inner peripheral wall connecting the pair of sidewalls on an inner peripheral side thereof. The friction parts include three kinds of friction part of first to third friction parts in which forms of the pair of sidewalls are different each other in plan view. Among them, the first friction part include the left sidewall inclining to the right and the right sidewall inclining to the left, with respect to an imaginary line segment $L_A$ connecting a center of gravity $P_A$ to the rotation center $P_0$, and the outer peripheral wall having a length less than that of the inner peripheral wall. The second friction part include the pair of sidewalls, both inclining to the right with respect to an imaginary line segment $L_B$ connecting a center of gravity $P_B$ to the rotation center $P_0$. The third friction part include the pair of sidewalls, both inclining to the left with respect to an imaginary line segment $L_C$ connecting a center of gravity Pc to the rotation center $P_0$.

In the wet friction body according to the first aspect, a wet friction body according to a second aspect of the invention is configured to satisfy expressions (1) and (2) below, $$N_{3A} < N_{3B} \quad (1)$$

$$N_{3A} < N_{3C} \quad (2)$$

where $N_{3A}$ is the number of the first friction parts disposed on the main surface of the core plate, $N_{3B}$ is the number of the second friction parts disposed thereon, and $N_{3C}$ is the number of the third friction parts disposed thereon.

In the wet friction body according to the first or second aspect, a wet friction body according to a third aspect of the invention is configured to dispose the first friction parts, the second friction parts, and the third friction parts such that the friction parts of an identical kind are not adjacent to each other.

In the wet friction body according to any one of the first to third aspects, a wet friction body according to a fourth aspect of the invention is configured to include a disposition X in which the second friction part, the first friction part, and the third friction part are disposed in the order described at respective three places.

In the wet friction body according to the fourth aspect, a wet friction body according to a fifth aspect of the invention is configured such that the disposition X is provided at three or more and twelve or less places in the main surface.

In the wet friction body according to any one of the first to third aspects, a wet friction body according to a sixth aspect of the invention is configured to include a disposition Y in which the third friction part, the second friction part, the first friction part, the third friction part, and the second friction part are disposed in the order described at respective five places.

In the wet friction body according to the sixth aspect, a wet friction body according to a seventh aspect of the invention is configured such that the disposition Y is provided at three or more and twelve or less places in the main surfaces.

In the wet friction body according to any one of the first to seventh aspects, a wet friction body according to an eighth aspect of the invention is configured to include at least one of a disposition $Z_1$ in which the second friction part, the third friction part, and the second friction part are disposed in the order described at respective three places, and a disposition $Z_2$ in which the third friction part, the second friction part, and the third friction part are disposed in the order described at respective three places.

Advantageous Effects of Invention

The present wet friction body has the flat ring shape, and includes the core plate in the flat ring shape with the center serving as the rotation center $P_0$, the plurality of friction parts disposed in the ring shape at intervals on each of the main surfaces of the core plate, and the plurality of oil grooves defined by the corresponding friction parts as the respective intervals.

Among them, in plan view, the friction parts each include the pair of sidewalls composed of the left sidewall forming the oil groove positioned on the left side of the friction portion and the right sidewall forming the oil groove positioned on the right side of the friction portion. The friction parts each further include the outer peripheral wall connecting the pair of sidewalls on the outer peripheral side thereof, and the inner peripheral wall connecting the pair of sidewalls on an inner peripheral side thereof.

The friction parts include three kinds of friction part of first to third friction parts in which forms of the pair od sidewall are different each other in plan view.

The first friction parts (3A) each include the left sidewall ($3A_{WL}$) inclining to the right and the right sidewall ($3A_{WR}$) inclining to the left, with respect to the imaginary line segment $L_A$ connecting the center of gravity $P_A$ to the rotation center $P_0$, and the outer peripheral wall ($3A_{WO}$) having the length less than that of the inner peripheral wall ($3A_{WI}$).

The second friction parts (3B) each include the pair of sidewalls ($3B_{WL}$ and $3B_{WR}$), both inclining to the right with respect to the imaginary line segment $L_B$ connecting the center of gravity $P_B$ to the rotation center $P_0$.

The third friction parts (3C) each include the pair of sidewalls ($3C_{WL}$ and $3C_{WR}$), both inclining to the left with respect to the imaginary line segment $L_C$ connecting the center of gravity $P_C$ to the rotation center $P_0$.

As described above, the three kinds of friction part different in form is provided as the plurality of friction parts, so that an effect of reduction of drag torque can be obtained by a structure different from that of a conventional wet friction body.

The present wet friction body can satisfy the following expression (1) "$N_{3A} < N_{3B}$" and expression (2) "$N_{3A} < N_{3C}$", where $N_{3A}$ is the number of the first friction parts (3A) disposed on the main surface of the core plate, $N_{3B}$ is the number of the second friction parts (3B) disposed thereon, and $N_{3C}$ is the number of the third friction parts (3C) disposed thereon. Conventionally, many wet friction bodies each use a segment piece in a fan-like shape or a trapezoidal shape as a friction part in many cases. However, in the present wet friction body, it is preferable that the first friction parts (3A), each of which has such a fan-like shape or a trapezoidal shape, be less in number than other kinds of friction part. This enables drag torque to be more reduced than when the first friction parts (3A) are more in number than the other kinds of friction part. In particular, drag torque in a low rotation region can be reduced more effectively.

When the present wet friction body is configured to dispose the first friction parts (3A), the second friction parts (3B), and the third friction parts (3C) such that the friction parts of an identical kind are not adjacent to each other, lubricating oil is prevented from being discharged outside the system excessively smoothly to promote flowing of the lubricating oil onto each of the friction parts. This enables obtaining a larger effect of detaching the present wet friction body from an adjacent separator plate. This action enables drag torque to be further reduced.

When the present wet friction body includes the disposition X in which the second friction part (3B), the first friction part (3A), and the third friction part (3C) are disposed in the order described at respective three places, an oil groove inclining to the right as a whole and an oil groove inclining to the left as a whole can be provided on each of sides across the first friction part (3A).

In other words, there can be provided an oil groove inclining to the right as a whole defined by the left sidewall ($3A_{WL}$) of the first friction part (3A), inclining to the right, and the right sidewall ($3B_{WR}$) of the second friction part (3B), inclining to the right. This oil groove can promote discharge of the lubricating oil when the wet friction body is rotated counterclockwise.

In addition, there can be provided an oil groove inclining to the left as a whole defined by the right sidewall ($3A_{WR}$) of the first friction part (3A), inclining to the left, and the left sidewall ($3C_{WL}$) of the third friction part (3C), inclining to the left. This oil groove can promote flowing of the lubricating oil onto the third friction part (3C) with the left sidewall ($3C_{WL}$) of the third friction part (3C), inclining to the left, when the wet friction body is rotated counterclockwise. When the wet friction body is rotated clockwise, this action is reversed naturally. When the disposition X is provided as a group as described above, the action can be applied in a substantially bilateral symmetric manner across the imaginary line segment $L_A$ connecting the center of gravity $P_A$ of the first friction part (3A) to the rotation center $P_0$, serving as the axis of symmetry. Then, an installed number of dispositions X enables control of discharging efficiency of the lubricating oil and the amount of flowing of the lubricating oil onto the friction parts. That is, increase in the installed number of the dispositions X reduces the number of the second friction parts (3B) and the third friction parts (3C) adjacent to each other to enable forming a wet friction body having higher discharging efficiency. Conversely, decrease in the installed number of the dispositions X increases the number of the second friction parts (3B) and the third friction parts (3C) adjacent to each other to enable forming a wet friction body in which flowing of the lubricating oil onto the friction parts is large in amount. This balance enables control of the lubricating oil according to the situation, so that drag torque can be reduced in a wide range from low rotation to high rotation.

When the present wet friction body includes the disposition Y in which the third friction part (3C), the second friction part (3B), the first friction part (3A), the third friction part (3C), and the second friction part (3B) are disposed in the order described at respective five places, an oil groove ($4_\triangledown$) opening outward from its inner peripheral side to its outer peripheral side can be provided on each of right and left sides across the disposition X described above.

That is, there can be provided the oil groove($4_\triangledown$) defined by the left sidewall ($3B_{WL}$) of the second friction part (3B) constituting the disposition X, disposed at a left end of the disposition X, and the right sidewall ($3C_{WR}$) of the third friction part (3C), disposed on a left side of the second friction part (3B). Likewise, there can be provided the oil groove($4_\triangledown$) defined by the right sidewall ($3C_{WR}$) of the third friction part (3C) constituting the disposition X, disposed at a right end of the disposition X, and the left sidewall ($3B_{WL}$) of the second friction part (3B), disposed on a right side of the third friction part (3C).

Each of the oil grooves ($4_\triangledown$) is an outwardly opened oil groove opening outward from its inner peripheral side to its outer peripheral side, so that it has a shape reducing discharge of the lubricating oil. As a result, when the present wet friction body is rotated counterclockwise as well as clockwise, the lubricating oil can be controlled such that discharge thereof is reduced in each of the oil grooves to cause a more amount of the lubricating oil to be supplied to the disposition X. This enables the disposition X to function more effectively.

When the present wet friction body includes the disposition $Z_1$ in which the second friction part (3B), the third friction part (3C), and the second friction part (3B) are disposed in the order described at respective three places, there can be provided an oil groove ($4_\triangle$) defined by the right sidewall ($3B_{WR}$) of the second friction part (3B) and the left sidewall ($3C_{WL}$) of the third friction part (3C), and an oil groove ($4_\triangledown$) defined by the right sidewall ($3C_{WR}$) of the third friction part and the left sidewall ($3B_{WL}$) of the second friction part (3B). The disposition $Z_1$ is provided on its left side with the oil groove ($4_\triangle$) and on its right side with the oil groove ($4_\triangledown$), and these oil grooves are disposed side by side. This facilitates taking in air from the oil groove ($4_\triangledown$) when the present wet friction body is rotated counterclockwise, thereby enabling reduction of drag torque in a wide range from low rotation to high rotation.

Likewise, when the present wet friction body includes the disposition $Z_2$ in which the third friction part (3C), the second friction part (3B), and the third friction part (3C) are disposed in the order described at respective three places, there can be provided an oil groove ($4_\triangledown$) defined by the left sidewall ($3C_{WL}$) of the third friction part (3C) and the right sidewall ($3B_{WR}$) of the second friction part (3B), and an oil groove($4_\triangle$) defined by the right sidewall ($3B_{WR}$) of the second friction part (3B) and the left sidewall ($3C_{WL}$) of the third friction part (3C). The disposition $Z_2$ is provided on its left side with the oil groove ($4_\triangledown$) and on its right side with the oil groove ($4_\triangle$). This facilitates taking in air from the oil groove ($4_\triangledown$) when the present wet friction body is rotated clockwise, thereby enabling reduction of drag torque in a wide range from low rotation to high rotation.

DESCRIPTION OF EMBODIMENTS

Figure 1:
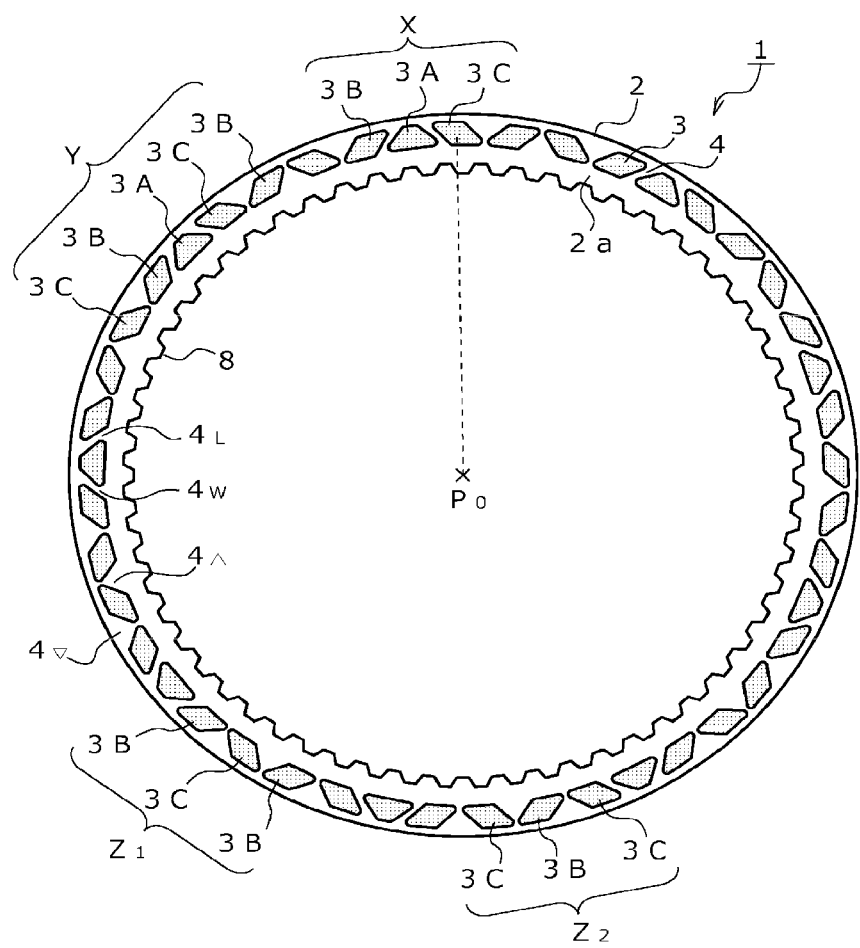
FIG. 1 is a plan view of an example (Example 1) of a present wet friction body.
Figure 2:
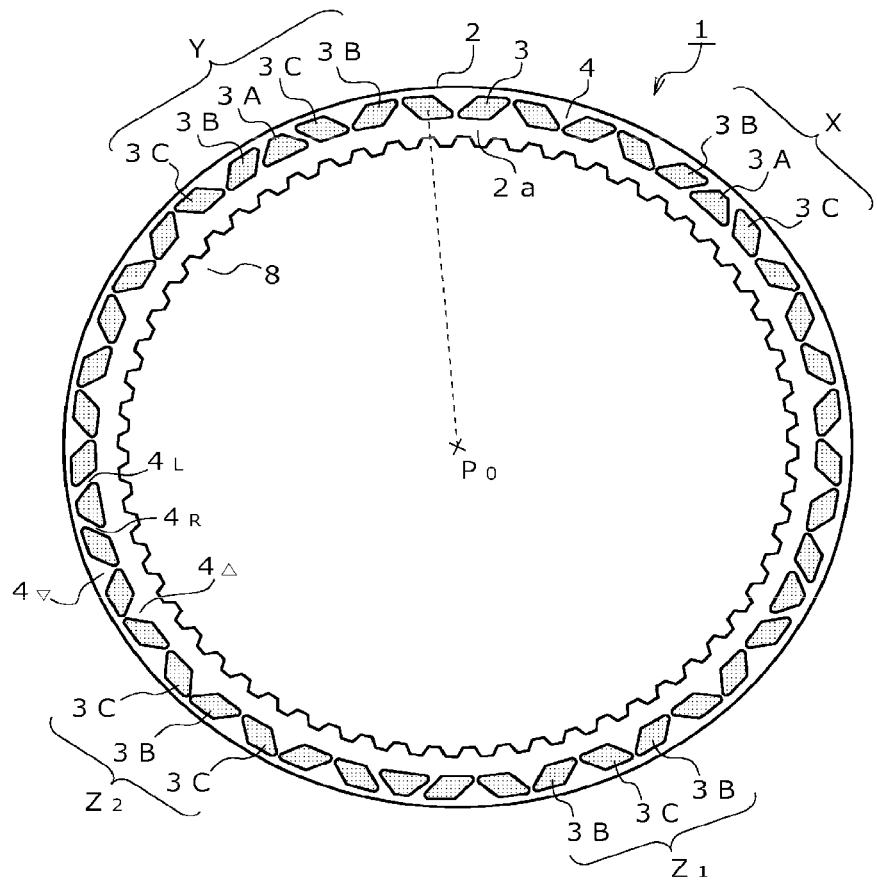
FIG. 2 is a plan view of another example (Example 2) of the present wet friction body.

Hereinafter, the present invention will be described with reference to the drawings. Matters described here are for illustrative purposes and description of embodiments of the present invention by way of example. The matters are described to provide description that seems to be the most effective and easy to understand the principle and conceptual features of the present invention. From this viewpoint, the description does not intend to present structural details of the invention above a certain level, which is necessary for a fundamental understanding of the present invention, but discloses how some aspects of the present invention are actually realized with reference to drawings for a person skilled in the art.

Wet Friction Body

The present wet friction body (1) has a flat ring shape, and includes a core plate (2) in the flat ring shape with the center serving as a rotation center $P_0$, a plurality of friction parts (3) disposed at intervals in a ring shape on a main surface (2a) of the core plate, and a plurality of oil grooves (4) defined by the corresponding friction parts (3) as the respective intervals. That is, the present wet friction body (1) includes not only the core plate (2) and the plurality of friction parts (3), but also the plurality of oil grooves (4) defined by sidewalls of the respective friction parts (3) (refer to FIGS. 1 to 4).

In the present wet friction body (1), each of the friction parts (3) in plan view includes a pair of sidewalls ($3_{WL}$, and $3_{WR}$) composed of a left sidewall ($3_{WL}$) defining an oil groove (4) positioned on a left side of the friction part (3) and a right sidewall ($3_{WR}$) defining an oil groove (4) positioned on a right side of friction part (3), an outer peripheral wall ($3_{WO}$) connecting the pair of sidewalls ($3_{WL}$ and $3_{WR}$) to each other on its outer peripheral side, and an inner peripheral wall ($3_{WI}$) connecting the pair of sidewalls ($3_{WL}$ and $3_{WR}$) to each other on its inner peripheral side (refer to FIGS. 1 to 4).

In addition, the friction parts (3) include three kinds of friction part of first to third friction parts (3A, 3B, and 3C) different in form of the pair of sidewall ($3_{WL}$ and $3_{WR}$) in plan view (refer to FIGS. 1 to 4).

The first friction parts (3A) each include a left sidewall ($3A_{WL}$) inclining to the right and a right sidewall ($3A_{WR}$) inclining to the left, with respect to an imaginary line segment ($L_A$) connecting a center of gravity ($P_A$) to the rotation center ($P_0$), and an outer peripheral wall having a length less than that of an inner peripheral wall.

The second friction parts (3B) each include a pair of sidewalls ($3B_{WL}$ and $3B_{WR}$), both inclining to the right with respect to an imaginary line segment ($L_B$) connecting a center of gravity ($P_B$) to the rotation center ($P_0$).

The third friction parts (3C) each include a pair of sidewalls ($3C_{WL}$ and $3C_{WR}$), both inclining to the left with respect to an imaginary line segment ($L_C$) connecting a center of gravity ($P_C$) to the rotation center ($P_0$).

The core plate 2 has a flat ring shape with a center serving as the rotation center $P_0$ of the wet friction body 1. The core plate 2 also has the main surface 2a. The main surface 2a is a surface on which the friction parts 3 are disposed. The main surface 2a may be only one of a front surface and a back surface of the core plate 2, or may be each of them.

The wet friction body 1 has the plurality of friction parts 3. The friction parts 3 are disposed at intervals in a ring shape on the main surface 2a of the core plate. The oil groove 4 is defined by sidewalls of the respective friction parts 3 as an interval between the respective friction parts 3.

The friction part 3 has a surface serving as a friction surface, and a degree of interlocking between the wet friction body 1 and the separator plate can be adjusted according to contact between the wet friction body 1 and the separator plate and a degree of the contact. That is, the wet friction body 1 has a brake function (braking function) and a torque transmission function, for the separator plate.

The oil groove 4 has a function of discharging lubricating oil supplied from an inner peripheral side of the present wet friction body 1 to an outer peripheral side of the wet friction body 1 through the oil groove 4. Depending on a shape of the oil groove 4, an action to be applied to lubricating oil can be varied. This enables the oil groove 4 to control the amount of discharge, whether to guide the lubricating oil onto the friction part 3, the amount of the lubricating oil flowing onto the friction part 3, and the like.

The plurality of friction parts 3 each in plan view includes the pair of sidewalls $3_{WL}$ and $3_{WR}$ composed of the left sidewall $3_{WL}$ ($3A_{WL}$, $3B_{WL}$, $3C_{WL}$, or the like) defining the oil groove 4 positioned on its left side, and the right sidewall $3_{WR}$ ($3A_{WR}$, $3B_{WR}$, $3C_{WR}$, or the like) defining the oil groove 4 positioned on its right side. The plurality of friction parts 4 further includes the outer peripheral wall $3_{WO}$ ($3A_{WO}$, $3B_{WO}$, $3C_{WO}$, or the like) connecting the pair of sidewalls $3_{WL}$ and $3_{WR}$ to each other on an outer peripheral side of the present wet friction body 1, and the inner peripheral wall $3_{WI}$ ($3A_{WI}$, $3B_{WI}$, $3C_{WI}$, or the like) connecting the pair of sidewalls $3_{WL}$ and $3_{WR}$ to each other on an inner peripheral side of the present wet friction body 1. Each of constituent walls constituting the respective friction parts 3 in plan view may have a linear shape, a curved shape, or an amorphous shape.

In addition, the plurality of friction parts 3 includes the three kinds of friction part of the first to third friction parts (3A, 3B, and 3C) different in form of the pair of sidewall $3_{WL}$ and $3_{WR}$ in plan view. That is, the plurality of friction parts 3 includes the three kinds of friction part, or the first friction part (hereinafter simply referred to as a "first friction part"), the second friction part (hereinafter simply referred to as a "second friction part"), and the third friction part (hereinafter simply referred to as a "third friction part"). The present wet friction body 1 may be composed of only the three kinds of friction part of the first friction part 3A, the second friction part 3B, and the third friction part 3C, or may include a friction part having another shape.

In plan view of each of the friction parts 3 in the wet friction body 1, it is assumed that each of the friction parts 3 is disposed at the 12 o'clock position in a clock face in plan view. That is, the right and left with respect to a predetermined friction part 3 mean the left and right when the predetermined friction part 3 is disposed at the 12 o'clock position.

First Friction Part (3A)

The first friction part 3A includes the left sidewall $3A_{WL}$ inclining to the right with respect to the imaginary line segment $L_A$ connecting the center of gravity $P_A$ to the rotation center $P_0$. That is, in plan view, an outer peripheral end of the left sidewall $3A_{WL}$ is positioned on a right side with respect to an inner peripheral end of the left sidewall $3A_{WL}$.

The first friction part 3A also includes the right sidewall $3A_{WR}$ inclining to the left with respect to the imaginary line segment $L_A$. That is, in plan view, an outer peripheral end of the right sidewall $3A_{WR}$ is positioned on a left side with respect to an inner peripheral end of the right sidewall $3A_{WR}$.

The first friction part 3A further includes the outer peripheral wall $3A_{WO}$ having a length $D_{3AWO}$ less than a length $D_{3AWI}$ of the inner peripheral wall $3A_{WI}$.

Thus, the first friction part 3A has a substantially trapezoidal shape in plan view, and the outer peripheral wall $3A_{WO}$ shorter in length than the inner peripheral wall $3A_{WI}$ is disposed facing the outer peripheral side.

Figure 9:
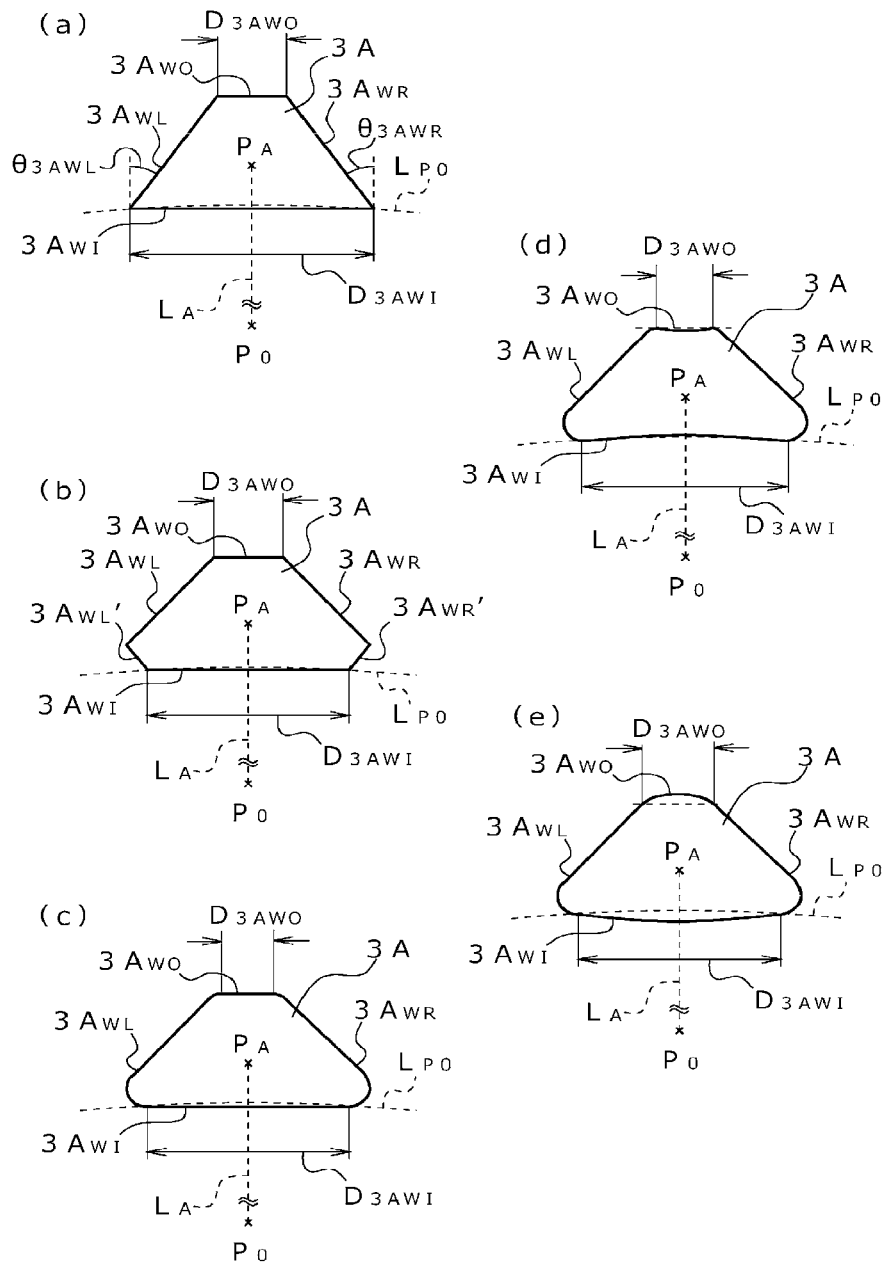
FIG. 9 is a plan view illustrating first friction parts in the present wet friction body.

While a more specific shape of the first friction part 3A is not particularly limited, various shapes are illustrated in FIG. 9, for example. In FIG. 9, $L_{PO}$ represents an imaginary circle passing through the left and right ends of the inner peripheral wall $3A_{WI}$ with the rotation center $P_0$ as its center.

FIG. 9(a) illustrates the first friction part 3A in which all constituent walls of the left sidewall $3A_{WL}$, the right sidewall $3A_{WR}$, the outer peripheral wall $3A_{WO}$, and the inner peripheral wall $3A_{WI}$ are each formed in a linear shape in plan view.

While any one of the left sidewall $3A_{WL}$ and the right sidewall $3A_{WR}$ may be formed longer than the other in plan view, the sidewalls each may have an identical length as illustrated in FIG. 9(a).

While an angle $\theta_{3AWL}$ (degree of inclination) of right inclination of the left sidewall $3A_{WL}$ with respect to the imaginary line segment $L_A$ is not limited, it is preferable that the angle $\theta_{3AWL}$ be 15 degrees or more. This enables increase in discharging efficiency of the lubricating oil in the oil groove 4 defined by the left sidewall $3A_{WL}$ (discharging efficiency when the wet friction body 1 rotates counterclockwise). The angle ($\theta_{3AWL}$) is more preferably 25 degrees or more, further preferably 35 degrees or more, and particularly preferably 40 degrees or more. While an upper limit of the angle $\theta_{3AWL}$ is not limited, the angle $\theta_{3AWL}$ may be set at sixty degrees or less, for example. The angle ($\theta_{3AWL}$) is more preferably 55 degrees or less, particularly preferably 50 degrees or less.

While an angle $\theta_{3AWR}$ (degree of inclination) of left inclination of the right sidewall $3A_{WR}$ with respect to the imaginary line segment $L_A$ is not limited, it is preferable that the angle $\theta_{3AWR}$ be 15 degrees or more. This enables increase in discharging efficiency of the lubricating oil in the oil groove 4 defined by the right sidewall $3A_{WR}$ (discharging efficiency when the wet friction body 1 rotates clockwise). The angle ($\theta_{3AWR}$) is more preferably 25 degrees or more, further preferably 35 degrees or more, and particularly preferably 40 degrees or more. While an upper limit of the angle $\theta_{3AWR}$ is not limited, the angle $\theta_{3AWR}$ may be set at sixty degrees or less, for example. The angle ($\theta_{3AWR}$) is more preferably 55 degrees or less, particularly preferably 50 degrees or less.

While the outer peripheral wall $3A_{WO}$ and the inner peripheral wall $3A_{WT}$ may not be disposed so as to be parallel to each other in plan view, they may be disposed to be parallel to each other as illustrated in FIG. 9(a).

In addition, while a ratio of a length $D_{3AWO}$ of the outer peripheral wall $3A_{WO}$ to a length $D_{3AWT}$ of the inner peripheral wall $3A_{WT}$ is not limited, $D_{3AWO}/D_{3AWT}$ is preferably 0.2 or more and 0.8 or less, more preferably 0.3 or more and 0.7 or less, for example.

The first friction part 3A in the form illustrated in FIG. 9(a) has an acute angle portion formed by the left sidewall $3A_{WL}$ and the inner peripheral wall $3A_{WT}$. Likewise, the first friction part 3A has an acute angle portion formed by the right sidewall $3A_{WR}$ and the inner peripheral wall $3A_{WT}$. This enables reduction in amount of lubricating oil flowing onto the friction surface of the first friction part 3A to improve discharging efficiency in the oil groove 4 on each of opposite sides of the first friction part 3A.

The first friction part 3A illustrated in FIG. 9(b) includes a sidewall $3A_{WL'}$ inclining to the left with respect to the imaginary line segment $L_A$ only in a part on an inner peripheral side of the left sidewall $3A_{WL}$ inclining to the right as a whole such that an acute angle portion is not formed between the left sidewall $3A_{WL}$ and the inner peripheral wall $3A_{WT}$. That is, in plan view, an outer peripheral end of the sidewall $3A_{WL'}$ is positioned on a left side with respect to an inner peripheral end of the sidewall $3A_{WL'}$. The sidewall $3A_{WL'}$ is usually 30% or less in length with respect to the entire left sidewall $3A_{WL}$ in plan view.

Likewise, the first friction part 3A includes a sidewall $3A_{WR'}$ inclining to the right with respect to the imaginary line segment $L_A$ only in a part on an inner peripheral side of the right sidewall $3A_{WR}$ inclining to the left as a whole such that an acute angle portion is not formed between the right sidewall $3A_{WR}$ and the inner peripheral wall $3A_{WT}$. That is, in plan view, an outer peripheral end of the sidewall $3A_{WR'}$ is positioned on a right side with respect to an inner peripheral end of the sidewall $3A_{WR'}$. The sidewall $3A_{WR'}$ is usually 30% or less in length with respect to the entire right sidewall $3A_{WR}$ in plan view.

FIG. 9(b) is different from FIG. 9(a) in the above point, but is otherwise the same as FIG. 9(a) in other respects. The first friction part 3A in the form illustrated in FIG. 9(b) has the left sidewall $3A_{WL'}$ and the right sidewall $3A_{WR'}$, so that flowing of lubricating oil onto the friction surface of the first friction part 3A is promoted to enable a part of the lubricating oil being about to pass through the oil groove 4 on each of opposite sides of the first friction part 3A to efficiently flow onto the friction surface of the first friction part 3A.

The first friction part 3A illustrated in FIG. 9(c) is provided on its inner peripheral side with a gentle curve connecting the left sidewall $3A_{WL}$ to the inner peripheral wall $3A_{WT}$ such that an acute angle portion is not formed between the left sidewall $3A_{WL}$ and the inner peripheral wall $3A_{WT}$. That is, the left sidewall $3A_{WL}$ and the inner peripheral wall $3A_{WT}$ are rounded so as not to form an acute angle portion therebetween. While a rounded region is not limited in length, it is usually 30% or less in length with respect to the entire left sidewall $3A_{WL}$ in plan view.

Likewise, the first friction part 3A is provided on its inner peripheral side with a gentle curve connecting the right sidewall $3A_{WR}$ to the inner peripheral wall $3A_{WT}$ such that an acute angle portion is not formed between the right sidewall $3A_{WR}$ and the inner peripheral wall $3A_{WT}$. That is, the right sidewall $3A_{WR}$ and the inner peripheral wall $3A_{WT}$ are rounded so as not to form an acute angle portion therebetween. While a rounded region is not limited in length, it is usually 30% or less in length with respect to the entire right sidewall $3A_{WR}$ in plan view.

FIG. 9(c) is different from FIG. 9(a) in the above point, but is otherwise the same as FIG. 9(a) in other respects. The first friction part 3A in the form illustrated in FIG. 9(c) has the gentle curve connecting the left sidewall $3A_{WL}$ to the inner peripheral wall $3A_{WT}$ and the gentle curve connecting the right sidewall $3A_{WR}$ to the inner peripheral wall $3A_{WT}$, so that flowing of lubricating oil onto the friction surface of the first friction part 3A is promoted to enable a part of the lubricating oil being about to pass through the oil groove 4 on each of opposite sides of the first friction part 3A to efficiently flow onto the friction surface of the first friction part 3A.

The first friction part 3A illustrated in FIG. 9(d) includes the inner peripheral wall $3A_{WT}$ that gently curves outward (concave curve) toward its central portion. The first friction part 3A also includes the outer peripheral wall $3A_{WO}$ that gently curves inward (concave curve) toward its central portion.

FIG. 9(d) is different from FIG. 9(c) in the above point, but is otherwise the same as FIG. 9(c) in other respects. The first friction part 3A in the form illustrated in FIG. 9(d) includes particularly the outer peripheral wall $3A_{WO}$ having a shape gently curving inward toward its central portion, so that a contact area with lubricating oil existing on the outer peripheral side is reduced to enable reduction of drag torque.

The first friction part 3A illustrated in FIG. 9(e) includes the inner peripheral wall $3A_{WT}$ that gently curves (convex curve) inward toward its central portion. The first friction part 3A also includes the outer peripheral wall $3A_{WO}$ that gently curves (convex curve) outward toward its central portion.

FIG. 9(e) is different from FIG. 9(c) in the above point, but is otherwise the same as FIG. 9(c) in other respects. The first friction part 3A in the form illustrated in FIG. 9(e) includes particularly the outer peripheral wall $3A_{WO}$ having a shape gently curving outward toward its central portion, so that a contact area with lubricating oil existing on the outer peripheral side is reduced to enable reduction of drag torque.

Second Friction Part (3B)

The second friction part 3B includes a left sidewall $3B_{WL}$ and a right sidewall $3B_{WR}$, both inclining to the right with respect to an imaginary line segment $L_B$ connecting a center of gravity $P_B$ to the rotation center $P_0$. That is, in plan view, an outer peripheral end of the left sidewall $3B_{WL}$ is positioned on a right side with respect to an inner peripheral end of the left sidewall $3B_{WL}$, and an outer peripheral end of the right sidewall $3B_{WR}$ is positioned on a right side with respect to an inner peripheral end of the right sidewall $3B_{WR}$. The second friction part 3B has a substantially rhombic shape.

The left sidewall $3B_{WL}$ and the right sidewall $3B_{WR}$ may be non-parallel to each other, or may be parallel to each other. In addition, the left sidewall $3B_{WL}$ and the right sidewall $3B_{WR}$ may be identical to each other in length, or may be different from each other in length. Each of the sidewalls can have a different function. This enables the left sidewall $3B_{WL}$ and the right sidewall $3B_{WR}$ to also be different from each other in length when inclination angles ($\theta_{3BWL}$ and $\theta_{3BWR}$) suitable for the corresponding functions are different, for example.

The second friction part 3B includes an outer peripheral wall $3B_{WO}$ and an inner peripheral wall $3B_{WT}$, which may be non-parallel to each other, or may be parallel to each other. In addition, a length $D_{3BWO}$ of the outer peripheral wall $3B_{WO}$ and a length $D_{3BWT}$ of the inner peripheral wall $3B_{WT}$ may be identical to each other or different from each other. While a ratio of the lengths is not limited, $D_{3BWO}/D_{3BWT}$ can be 0.8 or more and 1.3 or less, for example.

Figure 10:
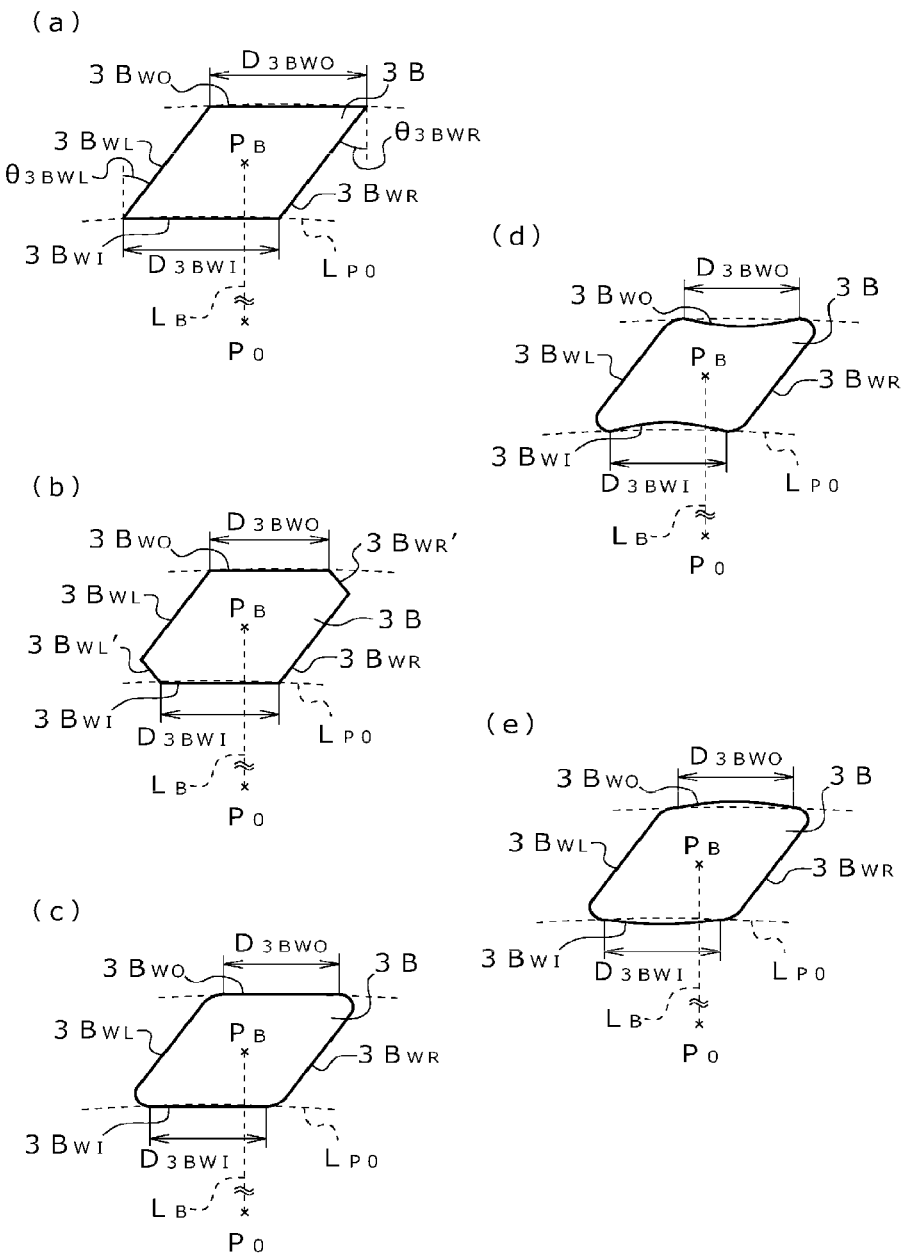
FIG. 10 is a plan view illustrating second friction parts in the present wet friction body.

In FIG. 10, $L_{PO}$ represents an imaginary circle passing through the left and right ends of the inner peripheral wall $3B_{WT}$ with the rotation center $P_0$ as its center.

FIG. 10(a) illustrates the second friction part 3B in which all constituent walls of the left sidewall $3B_{WL}$, the right sidewall $3B_{WR}$, the outer peripheral wall $3B_{WO}$, and the inner peripheral wall $3B_{WT}$ are each formed in a linear shape in plan view.

While any one of the left sidewall $3B_{WL}$ and the right sidewall $3B_{WR}$ may be formed longer than the other in plan view, the sidewalls each may have an identical length as illustrated in FIG. 10(a). In addition, while the left sidewall $3B_{WL}$ and the right sidewall $3B_{WR}$ may be disposed non-parallel to each other in plan view, they may be disposed parallel to each other as illustrated in FIG. 10(a).

While an angle $\theta_{3BWL}$ (degree of inclination) of right inclination of the left sidewall $3B_{WL}$ with respect to the imaginary line segment $L_B$ is not limited, it is preferable that the angle $\theta_{3BWL}$ is 25 degrees or more. This enables enhancing an action of taking air into the oil groove 4 defined by the left sidewall $3B_{WL}$, from its outer peripheral side to its inner peripheral side. This effect can be particularly exerted most effectively when an oil groove $4_V$ opening to the outer peripheral side is defined by disposing the second friction part 3B on the right side of the third friction part 3C. The angle ($\theta_{3BWL}$) is more preferably 35 degrees or more, particularly preferably 40 degrees or more. While an upper limit of the angle $\theta_{3BWL}$ is not limited, the angle $\theta_{3BWL}$ may be set at sixty degrees or less, for example. The angle ($\theta_{3BWL}$) is more preferably 55 degrees or less, particularly preferably 50 degrees or less.

While an angle $\theta_{3BWR}$ (degree of inclination) of right inclination of the right sidewall $3B_{WR}$ with respect to the imaginary line segment $L_B$ is not limited, it is preferable that the angle $\theta_{3BWR}$ be 15 degrees or more. This enables discharging efficiency of lubricating oil to be improved in the oil groove 4 defined by the right sidewall $3B_{WR}$. The angle ($\theta_{3BWR}$) is more preferably 25 degrees or more, further preferably 35 degrees or more, and particularly preferably 40 degrees or more. While an upper limit of the angle $\theta_{3BWR}$ is not limited, the angle $\theta_{3BWR}$ may be set at sixty degrees or less, for example. The angle ($\theta_{3BWR}$) is more preferably 55 degrees or less, particularly preferably 50 degrees or less.

The second friction part 3B in the form illustrated in FIG. 10 (a) has an acute angle portion formed by the left sidewall $3B_{WL}$ and the inner peripheral wall $3B_{WT}$. This form enables reduction in amount of lubricating oil flowing onto a friction surface to improve discharging efficiency in the oil groove 4 disposed on the left side of the second friction part 3B (particularly, effect in counterclockwise rotation) as compared with the second friction part 3B in the form illustrated in each of FIGS. 10(b) and 10(c) described below.

The second friction part 3B illustrated in FIG. 10(b) includes a sidewall $3B_{WL'}$ inclining to the left with respect to the imaginary line segment $L_B$ only in a part on an inner peripheral end side of the left sidewall $3B_{WL}$ inclining to the right as a whole with respect to the imaginary line segment $L_B$ such that an acute angle portion is not formed between the left sidewall $3B_{WL}$ and the inner peripheral wall $3B_{WT}$. The sidewall $3B_{WL'}$ is usually 30% or less in length with respect to the entire left sidewall $3B_{WL}$ in plan view.

Likewise, the second friction part 3B includes a sidewall $3B_{WR'}$ inclining to the left with respect to the imaginary line segment $L_B$ only in a part on an outer periphery end side of the right sidewall $3B_{WR}$ inclining to the right as a whole with respect to the imaginary line segment $L_B$ such that an acute angle portion is not formed between the right sidewall $3B_{WR}$ and the outer peripheral wall $3B_{WO}$. The sidewall $3B_{WR'}$ is usually 30% or less in length with respect to the entire right sidewall $3B_{WR}$ in plan view.

FIG. 10(b) is different from FIG. 10(a) in the above point, but is otherwise the same as FIG. 10(a) in other respects. The second friction part 3B in the form illustrated in FIG. 10(b) has the sidewall $3B_{WL'}$, so that flowing of lubricating oil onto the friction surface of the second friction part 3B is promoted to enable a part of the lubricating oil being about to pass through the oil groove 4 disposed on the left side of the second friction part 3B to efficiently flow onto the friction surface of the second friction part 3B (particularly, effect in counterclockwise rotation). In addition, providing the sidewall $3B_{WR'}$ enables reduction in resistance generated between the wet friction body 1 and the lubricating oil when the wet friction body 1 is rotated clockwise.

The second friction part 3B illustrated in FIG. 10(c) is provided with a gentle curve connecting the left sidewall $3B_{WL}$ to the inner peripheral wall $3B_{WT}$ on its inner peripheral side such that an acute angle portion is not formed between the left sidewall $3B_{WL}$ and the inner peripheral wall $3B_{WT}$. That is, the left sidewall $3B_{WL}$ and the inner peripheral wall $3B_{WT}$ are rounded so as not to form an acute angle portion therebetween. While a rounded region is not limited in length, it is usually 30% or less in length with respect to the entire sidewall $3B_{WL}$ in plan view.

Likewise, the second friction part 3B is provided with a gentle curve connecting the right sidewall $3B_{WR}$ to the outer peripheral wall $3B_{WO}$ on its outer peripheral side such that an acute angle portion is not formed between the right sidewall $3B_{WR}$ and the outer peripheral wall $3B_{WO}$. That is, the right sidewall $3B_{WR}$ and the outer peripheral wall $3B_{WO}$ are rounded so as not to form an acute angle portion therebetween. While a rounded region is not limited in length, it is usually 30% or less in length with respect to the entire sidewall $3B_{WR}$ in plan view.

FIG. 10(c) is different from FIG. 10(a) in the above point, but is otherwise the same as FIG. 10(a) in other respects. The second friction part 3B in the form illustrated in FIG. 10(c) has the gentle curve connecting the left sidewall $3B_{WL}$ to the inner peripheral wall $3B_{WT}$, so that flowing of lubricating oil onto the friction surface of the second friction part 3B is promoted to enable a part of the lubricating oil being about to pass through the oil groove 4 disposed on the left side of the second friction part 3B to efficiently flow onto the friction surface of the second friction part 3B. In addition, providing the gentle curve connecting the right sidewall $3B_{WR}$ to the outer peripheral wall $3B_{WO}$ enables reduction in resistance generated between the wet friction body 1 and the lubricating oil when the wet friction body 1 is rotated clockwise.

The second friction part 3B illustrated in FIG. 10(d) includes the inner peripheral wall $3B_{WT}$ that gently curves (concave curve) outward toward its central portion. The second friction part 3B also includes the outer peripheral wall $3B_{WO}$ that gently curves (concave curve) inward toward its central portion.

FIG. 10(d) is different from FIG. 10(c) in the above point, but is otherwise the same as FIG. 10(c) in other respects. The second friction part 3B in the form illustrated in FIG. 10(d) includes particularly the outer peripheral wall $3B_{WO}$ having a shape gently curving inward toward its central portion, so that a contact area with lubricating oil existing on the outer peripheral side is reduced to enable reduction of drag torque.

The second friction part 3B illustrated in FIG. 10(e) includes the inner peripheral wall $3B_{WT}$ that gently curves (convex curve) inward toward its central portion. The second friction part 3B also includes the outer peripheral wall $3B_{WO}$ that gently curves (convex curve) outward toward its central portion.

FIG. 10(e) is different from FIG. 10(c) in the above point, but is otherwise the same as FIG. 10(c) in other respects. The second friction part 3B in the form illustrated in FIG. 10(e) includes particularly the outer peripheral wall $3B_{WO}$ having a shape gently curving outward toward its central portion in the outer periphery direction, so that a contact area with lubricating oil existing on the outer peripheral side is reduced to enable reduction of drag torque.

Third Friction Part (3C)

The third friction part 3C includes a left sidewall $3C_{WL}$ and a right sidewall $3C_{WR}$, both inclining to the left with respect to an imaginary line segment $L_C$ connecting a center of gravity $P_C$ to the rotation center $P_0$. That is, in plan view, an outer peripheral end of the left sidewall $3C_{WL}$ is positioned on a right side with respect to an inner peripheral end of the left sidewall $3C_{WL}$, and an outer peripheral end of the right sidewall $3C_{WR}$ is positioned on a right side with respect to an inner peripheral end of the right sidewall $3C_{WR}$. The third friction part 3C has a substantially rhombic shape.

The left sidewall $3C_{WL}$ and the right sidewall $3C_{WR}$ may be non-parallel to each other, or may be parallel to each other. In addition, the left sidewall $3C_{WL}$ and the right sidewall $3C_{WR}$ may be identical to each other in length, or may be different from each other in length. Each of the sidewalls can have a different function. This enables the left sidewall $3C_{WL}$ and the right sidewall $3C_{WR}$ to also be different from each other in length when inclination angles ($\theta_{3BWL}$ and $\theta_{3BWR}$) suitable for the corresponding functions are different, for example.

The outer peripheral wall $3C_{WO}$ and the inner peripheral wall $3C_{WT}$ may be non-parallel to each other, or may be parallel to each other. In addition, a length $D_{3CWO}$ of the outer peripheral wall $3C_{WO}$ and a length $D_{3CWT}$ of the inner peripheral wall $3C_{WT}$ may be identical to each other or different from each other. While a ratio of the lengths is not limited, $D_{3CWO}/D_{3CWT}$ can be 0.8 or more and 1.3 or less, for example.

Figure 11:
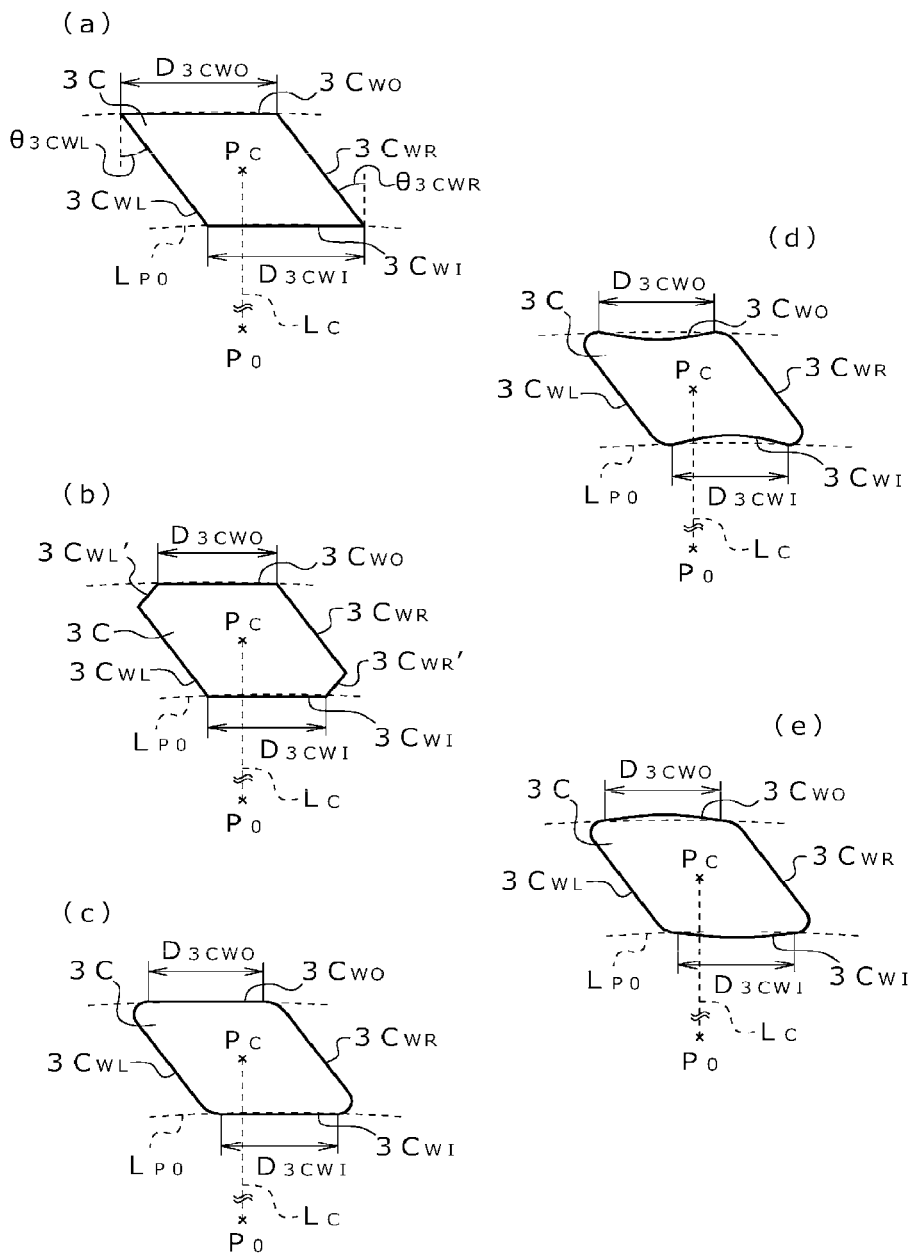
FIG. 11 is a plan view illustrating third friction parts in the present wet friction body.

In FIG. 11, $L_{PO}$ represents an imaginary circle passing through the left and right ends of the inner peripheral wall $3C_{WT}$ with the rotation center $P_0$ as its center.

When the friction part 3 is made of a friction base material (described below), the second friction part 3B and the third friction part 3C each may be formed as a different piece, or may be formed by an identical piece. When they are formed by the identical piece, there is a case where one side of the identical piece is used as the second friction part 3B and the other side thereof is used as the third friction part 3C, for example.

FIG. 11(a) illustrates the third friction part 3C in which all constituent walls of the left sidewall $3C_{WL}$, the right sidewall $3C_{WR}$, the outer peripheral wall $3C_{WO}$, and the inner peripheral wall $3C_{WT}$ are each formed in a linear shape in plan view.

While any one of the left sidewall $CB_{WL}$ and the right sidewall $3C_{WR}$ may be formed longer than the other in plan view, the sidewalls each may have an identical length as illustrated in FIG. 11(a). In addition, while the left sidewall $3C_{WL}$ and the right sidewall $3C_{WR}$ may be disposed non-parallel to each other in plan view, they may be disposed parallel to each other as illustrated in FIG. 11(a).

While an angle $\theta_{3CWL}$ (degree of inclination) of left inclination of the left sidewall $3C_{WL}$ with respect to the imaginary line segment $L_C$ is not limited, it is preferable that the angle $\theta_{3CWL}$ be 15 degrees or more. This enables promoting flowing of lubricating oil onto the friction surface of the third friction part 3C. That is, the left inclination of the left sidewall $3C_{WL}$ is used to enable a part of the lubricating oil being about to pass through the oil groove 4 disposed on the left side of the third friction part 3C to efficiently flow onto the friction surface of the third friction part 3C. The angle ($\theta_{3CWL}$) is more preferably 25 degrees or more, further preferably 35 degrees or more, and particularly preferably 40 degrees or more. While an upper limit of the angle $\theta_{3CWL}$ is not limited, the angle $\theta_{3CWL}$ may be set at sixty degrees or less, for example. The angle ($\theta_{3CWL}$) is more preferably 55 degrees or less, particularly preferably 50 degrees or less.

While an angle $\theta_{3CWR}$ (degree of inclination) of right inclination of the right sidewall $3C_{WR}$ with respect to the imaginary line segment $L_C$ is not limited, it is preferable that the angle $\theta_{3CWR}$ be 25 degrees or more. This enables enhancing an action of taking air into the oil groove 4 defined by the right sidewall $3C_{WR}$, from its outer peripheral side to its inner peripheral side. This effect can be particularly exerted most effectively when an oil groove $4_V$ opening to the outer peripheral side is defined by disposing the third friction part 3C on the left side of the second friction part 3B. The angle ($\theta_{3CWL}$) is more preferably 35 degrees or more, particularly preferably 40 degrees or more. While an upper limit of the angle $\theta_{3CWR}$ is not limited, the angle $\theta_{3CWR}$ may be set at sixty degrees or less, for example. The angle ($\theta_{3CWR}$) is more preferably 55 degrees or less, particularly preferably 50 degrees or less.

The third friction part 3C in the form illustrated in FIG. 11(a) has an acute angle portion formed by the right sidewall $3C_{WR}$ and the inner peripheral wall $3C_{WT}$. This form enables reduction in amount of lubricating oil flowing onto a friction surface to improve discharging efficiency in the oil groove 4 disposed on the right side of the third friction part 3C (particularly, effect in clockwise rotation) as compared with the third friction part 3C in the form illustrated in each of FIGS. 11(b) and 11(c) described below.

The third friction part 3C illustrated in FIG. 11(b) includes a sidewall $3C_{WL'}$ inclining to the right with respect to the imaginary line segment $L_C$ only in a part on an outer periphery end side of the left sidewall $3C_{WL}$ inclining to the left as a whole with respect to the imaginary line segment $L_C$ such that an acute angle portion is not formed between the left sidewall $3C_{WL}$ and the outer peripheral wall $3C_{WO}$. The sidewall $3C_{WL'}$ is usually 30% or less in length with respect to the entire left sidewall $3C_{WL}$ in plan view.

Likewise, the third friction part 3C includes a sidewall $3C_{WR'}$ inclining to the right with respect to the imaginary line segment $L_C$ only in a part on an inner periphery end side of the right sidewall $3C_{WR}$ inclining to the left as a whole with respect to the imaginary line segment $L_C$ such that an acute angle portion is not formed between the right sidewall $3C_{WR}$ and the inner peripheral wall $3C_{WT}$. The sidewall $3C_{WR'}$ is usually 30% or less in length with respect to the entire right sidewall $3C_{WR}$ in plan view.

FIG. 11(b) is different from FIG. 11(a) in the above point, but is otherwise the same as FIG. 11(a) in other respects. The third friction part 3C in the form illustrated in FIG. 11(b) has the sidewall $3C_{WR'}$, so that flowing of lubricating oil onto the friction surface of the third friction part 3C is promoted to enable a part of the lubricating oil being about to pass through the oil groove 4 disposed on the right side of the third friction part 3C to efficiently flow onto the friction surface of the third friction part 3C (particularly, effect in clockwise rotation). In addition, providing the sidewall $3C_{WL'}$ enables reduction in resistance generated between the wet friction body 1 and the lubricating oil when the wet friction body 1 is rotated counterclockwise.

The third friction part 3C illustrated in FIG. 11(c) is provided with a gentle curve connecting the left sidewall $3C_{WL}$ to the outer peripheral wall $3B_{WO}$ on its outer peripheral side such that an acute angle portion is not formed between the left sidewall $3C_{WL}$ and the outer peripheral wall $3C_{WO}$. That is, the left sidewall $3C_{WL}$ and the outer peripheral wall $3C_{WO}$ are rounded so as not to form an acute angle portion therebetween. While a rounded region is not limited in length, it is usually 30% or less in length with respect to the entire sidewall $3C_{WL}$ in plan view.

Likewise, the third friction part 3C is provided with a gentle curve connecting the right sidewall $3C_{WR}$ to the inner peripheral wall $3C_{WT}$ on its inner peripheral side such that an acute angle portion is not formed between the right sidewall $3C_{WR}$ and the inner peripheral wall $3C_{WT}$. That is, the right sidewall $3C_{WR}$ and the inner peripheral wall $3C_{WT}$ are rounded so as not to form an acute angle portion therebetween. While a rounded region is not limited in length, it is usually 30% or less in length with respect to the entire sidewall $3C_{WR}$ in plan view.

FIG. 11(e) is different from FIG. 11(a) in the above point, but is otherwise the same as FIG. 11(a) in other respects. The third friction part 3C in the form illustrated in FIG. 11(c) has the gentle curve connecting the right sidewall $3C_{WR}$ to the inner peripheral wall $3C_{WT}$, so that flowing of lubricating oil onto the friction surface of the third friction part 3C is promoted when the present wet friction body 1 is rotated clockwise, thereby enabling a part of the lubricating oil being about to pass through the oil groove 4 disposed on the right side of the third friction part 3C to efficiently flow onto the friction surface of the third friction part 3C. In addition, providing the gentle curve connecting the left sidewall $3C_{WL}$ to the outer peripheral wall $3C_{WO}$ enables reduction in resistance generated between the wet friction body 1 and the lubricating oil when the wet friction body 1 is rotated counterclockwise.

The third friction part 3C illustrated in FIG. 11(d) includes the inner peripheral wall $3C_{WT}$ that gently curves (concave curve) outward toward its central portion. The third friction part 3C also includes the outer peripheral wall $3C_{WO}$ that gently curves (concave curve) inward toward its central portion.

FIG. 11(d) is different from FIG. 11(c) in the above point, but is otherwise the same as FIG. 11(c) in other respects. The third friction part 3C in the form illustrated in FIG. 11(d) includes particularly the outer peripheral wall $3C_{WO}$ having a shape gently curving inward toward its central portion, so that a contact area with lubricating oil existing on the outer peripheral side is reduced to enable reduction of drag torque.

The third friction part 3C illustrated in FIG. 11(e) includes the inner peripheral wall $3C_{WT}$ that gently curves (convex curve) inward toward its central portion. The third friction part 3C also includes the outer peripheral wall $3C_{WO}$ that gently curves (convex curve) outward toward its central portion.

FIG. 11(e) is different from FIG. 11(c) in the above point, but is otherwise the same as FIG. 11(c) in other respects. The third friction part 3C in the form illustrated in FIG. 11(e) includes particularly the outer peripheral wall $3C_{WO}$ having a shape gently curving outward toward its central portion, so that a contact area with lubricating oil existing on the outer peripheral side is reduced to enable reduction of drag torque.

Number of Friction Parts

While the first friction parts 3A, the second friction parts 3B, and the third friction parts 3C, constituting the friction part 3 of the present wet friction body 1, are each not limited in number, it is preferable that the first friction parts 3A be less in number than the second friction parts 3B. It is also preferable that the first friction parts 3A be less in number than the third friction parts 3C. That is, when the number of the first friction parts 3A is indicated as $N_{3A}$ and the number of the second friction parts 3B is indicated as $N_{3B}$, it is preferable that $N_{3A}$ be less than $N_{3B}$. In addition, when the number of the first friction parts 3A is indicated as $N_{3A}$ and the number of the third friction parts 3C is indicated as $N_{3C}$, it is preferable that $N_{3A}$ be less than $N_{3C}$. Further, it is preferable that $N_{3A}$ be less than $N_{3B}$, and $N_{3A}$ is less than $N_{3C}$.

While conventionally, a segment piece having a fan-like shape or a trapezoidal shape is used as a friction part in many wet friction bodies, it is preferable that the first friction parts 3A, each of which has such a fan-like shape or a trapezoidal shape as described above, be less in number than other kinds of friction part in the present wet friction body 1. This enables drag torque to be more reduced than when the first friction parts 3A are more in number than the other kinds of friction part. In particular, drag torque in a low rotation region can be reduced more effectively.

While a correlation between $N_{3B}$ and $N_{3C}$ is not particularly limited, $N_{3B}$ may be equal to $N_{3C}$. In the present wet friction body 1, it is more preferable that $N_{3A}$ is less than $N_{3B}$, $N_{3A}$ be less than $N_{3C}$, and $N_{3B}$ be equal to $N_{3C}$.

In the present wet friction body 1, while the total number of friction parts 3 disposed on one of main surfaces 2a of the core plate 2 is not limited, it is usually 10 or more and 100 or less. The total number of the friction parts 3 is preferably 30 or more and 90 or less, more preferably 35 or more and 70 or less, particularly preferably 40 or more and 50 or less.

While a range of $N_{3A}$ is also not limited, it is preferably 3 or more and 12 or less, more preferably 4 or more and 11 or less, particularly preferably 5 or more and 10 or less, and especially preferably 5 or more and 9 or less, in the number of placements on the main surface 2a of the core plate 2.

The wet friction body 1 includes three kinds of friction part of the first friction part 3A, the second friction part 3B, and the third friction part 3C. While the friction parts 3 constituting the wet friction body 1 may include another friction part other than the three kinds of friction part, all of the friction parts 3 constituting the wet friction body 1 can be composed of only the three kinds of friction part.

Placement of Friction Parts

In the present wet friction body 1, while the respective friction parts 3 are not limited in placement, it is preferable that the respective three kinds of friction part 3 of the first friction part 3A, the second friction part 3B, and the third friction part 3C be disposed such that the friction parts of an identical kind are not adjacent to each other. That is, it is preferable that the wet friction body 1 do not have placement as follows: the first friction part 3A and the first friction part 3A are adjacent to each other; the second friction part 3B and the second friction part 3B are adjacent to each other; and the third friction part 3C and the third friction part 3C are adjacent to each other. This enables sufficiently exerting an effect of using friction parts in three different shapes, which are the first friction parts 3A, the second friction parts 3B, and the third friction parts 3C, in combination with each other.

Figure 5:
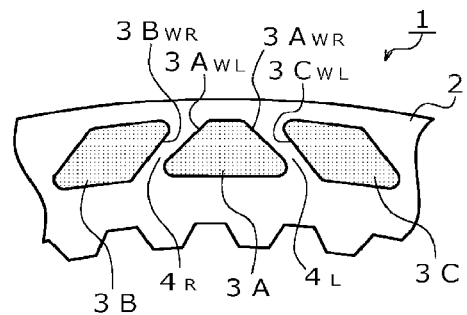
FIG. 5 is a partial perspective view illustrating a disposition X in the present wet friction body.

In addition, it is preferable that the present wet friction body 1 include a disposition X (refer to FIG. 5, and FIGS. 1 and 2) in which the second friction part 3B, the first friction part 3A, and the third friction part 3C are disposed at respective three places in the order described. That is, it is preferable that one or more sets of the above-described dispositions X are provided in one of main surfaces 2a of the core plate 2. When the disposition X is provided, an oil groove $4_R$ inclining to the right as a whole and an oil groove $4_L$ inclining to the left as a whole can be provided on respective sides across the first friction part 3A.

That is, there can be provided the oil groove $4_R$ defined by the left sidewall $3A_{WL}$ of the first friction part 3A, inclining to the right, and the right sidewall $3B_{WR}$ of the second friction part 3B, inclining to the right. The oil grooves $4_R$ can serve as an oil groove that promotes discharge of lubricating oil when the wet friction body 1 is rotated counterclockwise. At the same time, there can be provided the oil groove $4_L$ defined by the right sidewall $3A_{WR}$ of the first friction part 3A, inclining to the left, and the left sidewall $3C_{WL}$ of the third friction part 3C, inclining to the left. The oil groove $4_L$ can promote flowing of the lubricating oil onto the third friction part 3C with the left sidewall $3C_{WL}$ inclining to the left, when the wet friction body is rotated counterclockwise.

The function of each of the oil groove $4_R$ and the oil groove $4_L$ is reversed naturally when the wet friction body is rotated clockwise.

When the disposition X is provided as a group as described above, the action can be applied in a substantially bilateral symmetric manner across the imaginary line segment $L_A$ connecting the center of gravity $P_A$ of the first friction part to the rotation center $P_0$, serving as the axis of symmetry. Then, an installed number of dispositions X enables control of discharging efficiency of the lubricating oil and the amount of flowing of the lubricating oil onto the friction parts. That is, increase in the installed number of the dispositions X reduces the number of the second friction parts 3B and the third friction parts 3C adjacent to each other to enable forming a wet friction body having higher discharging efficiency. Conversely, decrease in the installed number of the dispositions X increases the number of the second friction parts 3B and the third friction parts 3C adjacent to each other to enable forming a wet friction body in which flowing of the lubricating oil onto the friction parts is large in amount. This balance enables control of the lubricating oil according to the situation, so that drag torque can be reduced in a wide range from low rotation to high rotation.

While the number of the dispositions X provided on one of main surfaces 2a of the core plate 2 of the present wet friction body 1 is not limited, it can be 3 or more and 12 or less. The number of the dispositions X is preferably 4 or more and 11 or less, more preferably 5 or more and 10 or less, particularly preferably 5 or more and 9 or less.

Figure 6:
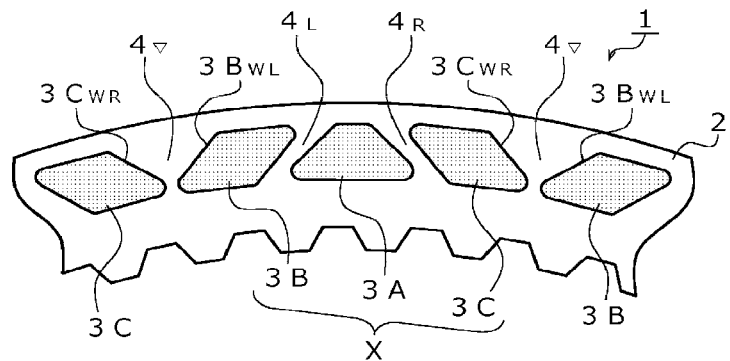
FIG. 6 is a partial perspective view illustrating a disposition Y in the present wet friction body.

It is preferable that the present wet friction body 1 include a disposition Y (refer to FIG. 6, and FIGS. 1 and 2) in which the third friction part 3C, the second friction part 3B, the first friction part 3A, the third friction part 3C, and the second friction part 3B are disposed at respective five places in the order described.

When the disposition Y is provided, there can be provided an oil groove $4_\nabla$ defined by the right sidewall $3C_{WR}$ of the third friction part 3C, inclining to the left, and the left sidewall $3B_{WL}$ of the second friction part 3B, inclining to the right, on the right side of the disposition X described above.

Likewise, there can be provided an oil groove $4_\nabla$ defined by the right sidewall $3C_{WR}$ of the third friction part 3C, inclining to the left, and the left sidewall $3B_{WL}$ of the second friction part 3B, inclining to the right, also on the left side of the disposition X described above.

These oil grooves $4_\nabla$ each have an opening on its inner peripheral side that is smaller than that on its outer peripheral side, and each have a groove width increasing toward the outer peripheral side. That is, the oil grooves $4_\nabla$ each are an outwardly opened oil groove. This causes each of the oil grooves $4_\nabla$ to have a shape reducing discharge of the lubricating oil. As a result, when the present wet friction body 1 is rotated counterclockwise as well as clockwise, the lubricating oil can be controlled such that discharge thereof is reduced in each of the oil grooves $4_\nabla$ to cause a more amount of the lubricating oil to be supplied to the disposition X. This enables the disposition X to function more effectively.

While the number of the dispositions Y provided on one of main surfaces 2a of the core plate 2 of the present wet friction body 1 is not limited, it can be 3 or more and 12 or less. The number of the dispositions Y is preferably 4 or more and 11 or less, more preferably 5 or more and 10 or less, particularly preferably 5 or more and 9 or less.

It is preferable that the present wet friction body 1 includes at least one of a disposition $Z_1$ and a disposition $Z_2$, described below.

Figure 7:
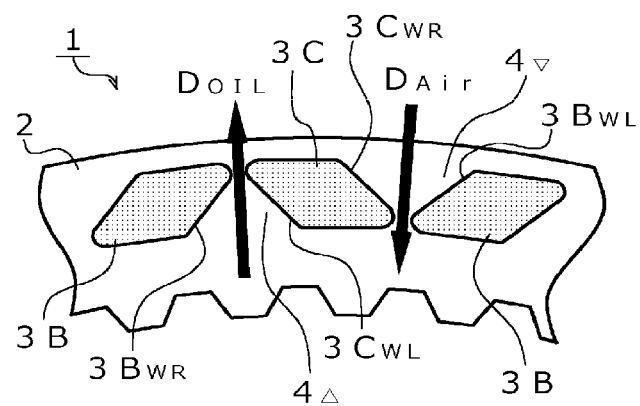
FIG. 7 is a partial perspective view illustrating a disposition $Z_1$ in the present wet friction body.

The disposition $Z_1$ (refer to FIG. 7, and FIGS. 1 and 2) includes the second friction part 3B, the third friction part 3C, and the second friction part 3B, which are disposed at respective three places in the order described.

When the present wet friction body 1 includes the disposition $Z_1$, there can be provided an oil groove $4_\Delta$ defined by the right sidewall $3B_{WR}$ of the second friction part 3B, inclining to the right, and the left sidewall $3C_{WL}$ of the third friction part 3C, inclining to the left, and an oil groove $4_\nabla$ defined by the right sidewall $3C_{WR}$ of the third friction part 3C, inclining to the left, and the left sidewall $3B_{WL}$ of the second friction part 3B, inclining to the right, the oil grooves $4_\Delta$ and $4_\nabla$ being provided side by side. That is, the disposition $Z_1$ is provided with the oil groove $4_\Delta$ on its left side and with the oil groove $4_\nabla$ on its right side, and these oil grooves are disposed side by side. This facilitates taking in air from the oil groove $4_\nabla$ when the present wet friction body 1 is rotated counterclockwise (refer to arrow $D_{Air}$ in FIG. 7). Particularly, it is considered that this intake of air is caused by discharge of the lubricating oil in the oil groove $4_\Delta$ (refer to arrow $D_{OIL}$ in FIG. 7). This intake of air enables drag torque to be reduced in a wide range from low rotation to high rotation.

As described above, while the oil groove $4_\nabla$ is an outwardly opened oil groove (an oil groove having an opening on its inner peripheral side that is smaller than that on its outer peripheral side, and having a groove width increasing toward the outer peripheral side), the oil groove $4_\Delta$ is an inwardly opened oil groove (an oil groove having an opening on its outer peripheral side that is smaller than that on its inner peripheral side, and having a groove width increasing toward the inner peripheral side). The same applies to not only the disposition $Z_1$ but also the disposition $Z_2$.

Figure 8:
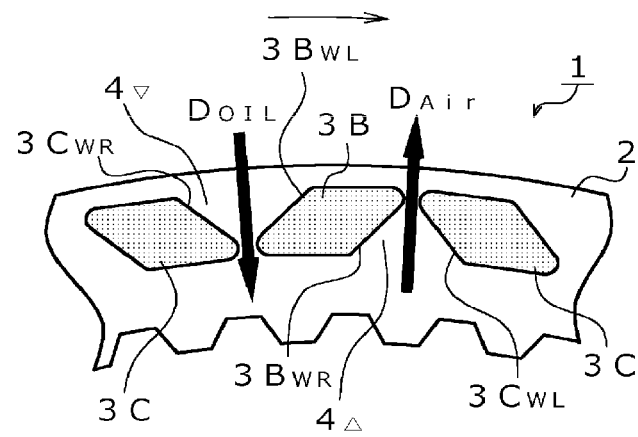
FIG. 8 is a partial perspective view illustrating a disposition $Z_2$ in the present wet friction body.

The disposition $Z_2$ (refer to FIG. 8, and FIGS. 1 and 2) includes one of third friction parts 3C, the second friction part 3B, and the third friction part 3C, which are disposed at respective three places in the order described.

When the present wet friction body 1 includes the disposition $Z_2$, there can be provided an oil groove $4_\nabla$ defined by the right sidewall $3C_{WR}$ of the third friction part 3C, inclining to the left, and the left sidewall $3B_{WL}$ of the second friction part 3B, inclining to the right, and an oil groove $4_\Delta$ defined by the right sidewall $3B_{WR}$ of the second friction part 3B, inclining to the right, and the left sidewall $3C_{WL}$ of the third friction part 3C, inclining to the left, the oil grooves $4_\nabla$ and $4_\Delta$ being provided side by side. That is, the disposition $Z_2$ is provided with the oil groove $4_\nabla$ on its left side and with the oil groove $4_\Delta$ on its right side, and these oil grooves are disposed side by side. This facilitates taking in air from the oil groove $4_\nabla$ when the present wet friction body 1 is rotated clockwise (refer to arrow $D_{Air}$ in FIG. 8). Particularly, it is considered that this intake of air is caused by discharge of the lubricating oil in the oil groove $4_\Delta$ (refer to arrow $D_{OIL}$ in FIG. 8). This intake of air enables drag torque to be reduced in a wide range from low rotation to high rotation.

While only any one of the disposition $Z_1$ and the disposition $Z_2$ may be provided, it is preferable to provide both of them in one of main surfaces 2a of the core plate 2. When both the disposition $Z_1$ and the disposition $Z_2$ are provided, an installed number of any one of them may be more than that of the other. However, it is preferable to provide the same number of the dispositions $Z_1$ and $Z_2$. This enables drag torque to be reduced in a balanced manner. When three different kinds of disposition of the disposition X, the disposition $Z_1$, and the disposition $Z_2$ are simultaneously provided, it is preferable that the number of the dispositions $Z_1$ is more than the number of the dispositions X. In addition, it is preferable that the number of the dispositions $Z_2$ be more than the number of the dispositions X. Further, it is preferable that the number of the dispositions $Z_1$ and the number of the dispositions $Z_2$ be identical to each other.

Each of the friction parts 3 described above may be formed on the main surface 2a of the core plate 2 in any manner. For example, the friction parts 3 can be formed from a plurality of friction base materials (segment pieces) bonded to the main surface 2a of the core plate 2. The friction parts 3 also can be formed by press-working such that parts to be the respective friction parts 3 are left in the form of islands on the surface of the core plate 2, or by cutting such that parts to be the respective friction parts 3 are left in the form of islands thereon, for example. A method for bonding the core plate 2 and the friction base materials to each other is not limited, and methods such as thermal fusion bonding, and adhesion with an adhesive or the like, can be used, for example.

Figure 3:
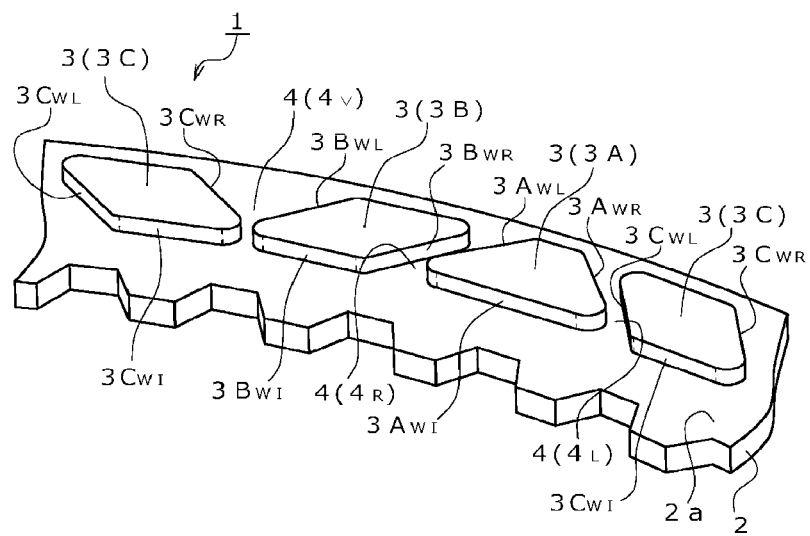
FIG. 3 is a partial perspective view illustrating friction parts and oil grooves in the present wet friction body.
Figure 4:
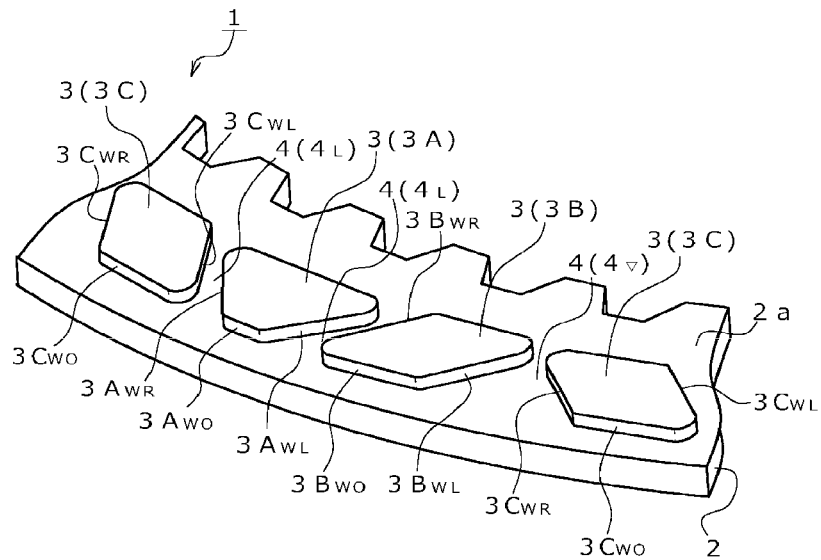
FIG. 4 is a partial perspective view illustrating friction parts and oil grooves in the present wet friction body.

FIGS. 3 and 4 each illustrate an example in which the friction part 3 is formed using a friction base material.

While the friction base material is not limited in composition, it can be obtained in such a manner that a paper sheet formed by mixing base material fibers and fillers and papermaking is impregnated with a thermosetting resin, and then is heated and cured, for example.

As the base material fibers, not only cellulose fiber (pulp), acrylic fiber, aramid fiber, and the like, but also various kinds of synthetic fiber, regenerated fiber, inorganic fiber, natural fiber, and the like, can be used. The base material fibers can have an average length of 0.5 mm to 5 mm. In addition, the base material fibers can have an average diameter of 0.1 μm to 6 μm.

Examples of the fillers can include cashew dust as a friction modifier, graphite and/or molybdenum disulfide as a solid lubricant, diatomaceous earth as an extender pigment, and the like. Only one of kinds of filler described above may be used, or two or more kinds thereof may be used in combination with each other. As the thermosetting resin, a phenol resin and/or a modified resin thereof can be used.

EXAMPLES

Hereinafter, the present invention will be described with reference to Examples. Descriptions common to each example will be eliminated.

Adjustment of wet friction body

Example 1

A wet friction body 1 (refer to FIG. 1) of Example 1 includes a core plate 2, and friction parts 3 composed of segment pieces disposed on main surfaces 2a (both the main surface 2a on the front side and the main surface 2a on the back side) of the core plate 2 (each of the main surface 2a on the front side and the main surface 2a on the back side has the same configuration of the friction parts 3). The respective segment pieces are obtained in such a manner that a paper sheet formed by papermaking using base material fibers such as pulp and aramid fiber, a friction modifier such as cashew dust, and fillers such as diatomaceous earth, is impregnated with a thermosetting resin (resin bonding agent), and then is heated and cured. The segment pieces are bonded to both the front and back main surfaces of the core plate 2 by being pressed and heated to form the friction parts 3.

The core plate 2 is made of NCH 780, and is provided with spline internal teeth 8 formed in a gear shape in its inner periphery. The spline internal teeth 8 are disposed so as to be engageable with splines disposed on an outer periphery of a hub serving as a rotation shaft for the wet friction body 1.

The core plate 2 has an outer diameter $R_1$, and an inner diameter $R_2$ (a diameter defined by the inner periphery of the core plate 2 except the spline internal teeth 8), a ratio $R_1/R_2$ being 1.06 ($R_1$ is 170 mm, and $R_2$ is 160 mm).

The core plate 2 is provided on its both front and back sides with the respective main surfaces 2a to each of which a plurality of segment pieces each having a thickness of 0.3 mm to 1.2 mm is bonded, and the segment pieces serve as the respective friction parts 3. The segment pieces serving as the friction parts 3 are disposed on the core plate 2 at predetermined intervals so as to be annular as a whole. The interval defined between the friction parts 3 of the segment pieces serves as the oil groove 4.

The friction parts 3 of the wet friction body 1 of Example 1 include three kinds of friction part 3 of the first friction part 3A, the second friction part 3B, and the third friction part 3C. The first friction part 3A has the form illustrated in FIG.

9(c), and $\theta_{3AWL}$ and $\theta_{3AWR}$ are each set to the same predetermined angle of 15 degrees or more. In the wet friction body 1 of Example 1, the number $N_{3A}$ of the first friction parts 3A disposed on the main surface 2a of the core plate 2 is 9.

The second friction part 3B of the wet friction body 1 of Example 1 has the form illustrated in FIG. 10(c), and $\theta_{3BWL}$ is set to a predetermined angle of 25 degrees or more and $\theta_{3BWR}$ is set to a predetermined angle of 15 degrees or more. In the wet friction body 1 of Example 1, the number $N_{3B}$ of the second friction parts 3B disposed on the main surface 2a of the core plate 2 is 18.

The third friction part 3C of the wet friction body 1 of Example 1 has the form illustrated in FIG. 11(e), and $\theta_{3CWL}$ is set to a predetermined angle of 15 degrees or more and $\theta_{3CWR}$ is set to a predetermined angle of 25 degrees or more. In the wet friction body 1 of Example 1, the number $N_{3C}$ of the third friction parts 3C disposed on the main surface 2a of the core plate 2 is 18.

That is, $N_{3A}$ is less than $N_{3B}$, $N_{3A}$ is less than $N_{3C}$, and $N_{3B}$ is equal to $N_{3C}$.

The wet friction body 1 of Example 1 includes dispositions X in each of which the friction parts 3 are disposed in a specific placement, and the dispositions X are disposed at respective nine places on the main surface 2a of the core plate 2. The wet friction body 1 of Example 1 also includes dispositions Y in each of which the friction parts 3 are disposed in a specific placement, and the dispositions Y are disposed at respective nine places on the main surface 2a of the core plate 2.

In addition, the wet friction body 1 of Example 1 includes dispositions $Z_1$ in each of which the friction parts 3 are disposed in a specific placement, and the dispositions $Z_1$ are disposed at respective nine places on the main surface 2a of the core plate 2. Further, the wet friction body 1 of Example 1 includes dispositions $Z_2$ in each of which the friction parts 3 are disposed in a specific placement, and the dispositions $Z_2$ are disposed at respective nine places on the main surface 2a of the core plate 2.

Example 2

The wet friction body 1 (refer to FIG. 2) of Example 2 includes the core plate 2, and the friction parts 3 composed of segment pieces disposed on the main surfaces 2a (both the main surface 2a on the front side and the main surface 2a on the back side) of the core plate 2 (each of the main surface 2a on the front side and the main surface 2a on the back side has the same configuration of the friction parts 3). The core plate 2 and the segment pieces are common to Example 1, and the interval defined between the friction parts 3 of the segment pieces serves as the oil groove 4.

The friction parts 3 of the wet friction body 1 of Example 2 include three kinds of friction part 3 of the first friction part 3A, the second friction part 3B, and the third friction part 3C. The structure of each of the three kinds of friction part 3 is common to Example 1.

In the wet friction body 1 of Example 2, the number $N_{3A}$ of the first friction parts 3A disposed on the main surface 2a of the core plate 2 is 5.

In the wet friction body 1 of Example 2, the number $N_{3B}$ of the second friction parts 3B disposed on the main surface 2a of the core plate 2 is 20.

In the wet friction body 1 of Example 2, the number $N_{3C}$ of the third friction parts 3C disposed on the main surface 2a of the core plate 2 is 20.

That is, $N_{3A}$ is less than $N_{3B}$, $N_{3A}$ is less than $N_{3C}$, and $N_{3B}$ is equal to $N_{3C}$.

The wet friction body 1 of Example 2 includes dispositions X in each of which the friction parts 3 are disposed in a specific placement, and the dispositions X are disposed at respective five places on the main surface 2a of the core plate 2. The wet friction body 1 of Example 2 also includes dispositions Y in each of which the friction parts 3 are disposed in a specific placement, and the dispositions Y are disposed at respective five places on the main surface 2a of the core plate 2.

In addition, the wet friction body 1 of Example 2 includes dispositions $Z_1$ in each of which the friction parts 3 are disposed in a specific placement, and the dispositions $Z_1$ are disposed at respective fifteen places on the main surface 2a of the core plate 2. Further, the wet friction body 1 of Example 2 includes dispositions $Z_2$ in each of which the friction parts 3 are disposed in a specific placement, and the dispositions $Z_2$ are disposed at respective fifteen places on the main surface 2a of the core plate 2.

Comparative Example 1

Figure 13:
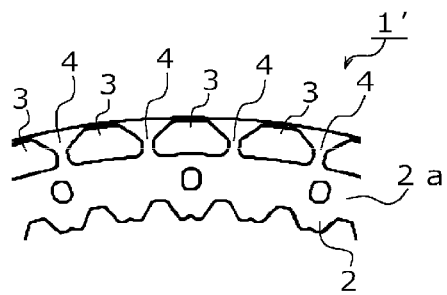
FIG. 13 is a partial plan view illustrating a comparative example (Comparative example 1).

A wet friction body 1' (refer to FIG. 13) of Comparative Example 1 includes a core plate 2, and friction parts 3 composed of segment pieces disposed on main surfaces 2a (both the main surface 2a on the front side and the main surface 2a on the back side) of the core plate 2 (each of the main surface 2a on the front side and the main surface 2a on the back side has the same configuration of the friction parts 3). The core plate 2 and the segment pieces are common to Example 1, and the interval defined between the friction parts 3 of the segment pieces serves as the oil groove 4.

The friction parts 3 of the wet friction body 1 of Comparative Example 1 include only one kind of friction part 3, which is the first friction part 3A. The first friction part 3A has the form illustrated in FIG. 9(c), and $\theta_{3AWL}$ and $\theta_{3AWR}$ are each set to the same predetermined angle of 15 degrees or more. In the wet friction body 1 of Comparative Example 1, the number $N_{3A}$ of the first friction parts 3A disposed on the main surface 2a of the core plate 2 is 45.

Comparative Example 2

A wet friction body 1' (refer to FIG. 14) of Comparative Example 2 includes a core plate 2, and friction parts 3 composed of segment pieces disposed on main surfaces 2a (both the main surface 2a on the front side and the main surface 2a on the back side) of the core plate 2 (each of the main surface 2a on the front side and the main surface 2a on the back side has the same configuration of the friction parts 3). The core plate 2 and the segment pieces are common to Example 1, and the interval defined between the friction parts 3 of the segment pieces serves as the oil groove 4.

Figure 14:
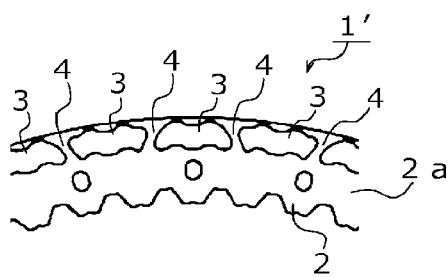
FIG. 14 is a partial plan view illustrating a comparative example (Comparative example 2).

As illustrated in FIG. 14, the friction parts 3 of the wet friction body 1 of Comparative Example 2 include segment pieces each of which is machined such that its outer and inner peripheral walls each have asperities. These segment pieces are provided by alternately turning the outer peripheral side and the inner peripheral side upside down, and the total number of the segment pieces is 45.

Correlation Between Drag Torque and Rotational Speed

Figure 12:
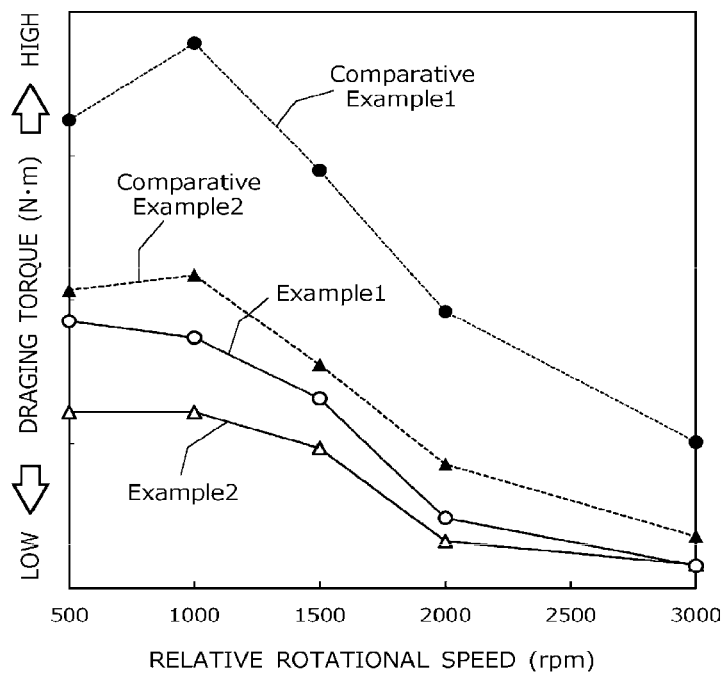
FIG. 12 is a graph showing a correlation between drag torque and rotational speed of each wet friction body.

For three sheets of each of the wet friction bodies of Examples 1 and 2, and Comparative Examples 1 and 2, in Section [1] above, drag torque was measured using an SAE friction tester under the following conditions at a rotational speed of 500 rpm to 3000 rpm. FIG. 12 shows obtained results as a graph (FIG. 12 shows drag torque that increases toward an upper side of the vertical axis).

Three sheets of wet friction bodies as test specimens were set under the conditions where automatic transmission lubricating oil (while AutoAtic Transmission Fluid (ATF) is a registered trademark of Idemitsu Kosan Co., Ltd., the automatic transmission lubricating oil is abbreviated as "ATF" regardless of the registered trademark) has an oil temperature of 40° C., and an amount of ATF oil of 300 mL/min (external lubrication), and a pack clearance is 0.20 mm/sheet. Then, the rotational speed was changed from 500 rpm to 3000 rpm and the drag torque (N·m) was measured at six points that were at 500 rpm, 1000 rpm, 1500 rpm, 2000 rpm, 2500 rpm, and 3000 rpm. The measurement time was 15 seconds per rotation, and the number of repetitions was five.

(2) Effect of Test Example

FIG. 12 shows the results in which while the wet friction body of Comparative Example 1 including one kind of friction part 3 disposed so as to face the same direction was able to relatively favorably reduce the drag torque in a high rotation region of 2000 rpm to 3000 rpm, the drag torque in a low to medium rotation range of 500 rpm to 1500 rpm was not sufficiently reduced. That is, it can be seen that the reduction of the drag torque in the low to middle rotation range of 500 rpm to 1500 rpm and the reduction of the drag torque in the high rotation range of 2000 rpm to 3000 rpm were different from each other.

In contrast, it can be seen that Comparative Example 2, in which upper and lower sides (the inner and outer peripheral sides) of one kind of friction part 3 were alternately turned upside down, favorably reduced the drag torque in the high rotation region of 2000 rpm to 3000 rpm as compared with Comparative Example 1.

However, in both Comparative Example 1 and Comparative Example 2, it can be seen that the drag torque at 1000 rpm was larger than the drag torque at 500 rpm.

Meanwhile, the wet friction bodies of Examples 1 and 2 each achieved further reduction of drag torque in all the rotation ranges from the high rotation range to the low rotation range of 500 rpm to 3000 rpm even in comparison with the wet friction body of Comparative Example 2. The reason why this effect was able to be obtained is not clear. While the wet friction body of Comparative Example 1 was a form having only "$4_V$"-type oil grooves, and the wet friction body of Comparative Example 2 was a form having "$4_R$"-type oil grooves inclining to the right and "$4_L$"-type oil grooves inclining to the left, they were not able to achieve satisfactory reduction of drag torque, as described above. In contrast, the wet friction bodies of Examples 1 and 2 each include all of the "$4_V$"-type oil grooves, the "$4_R$"-type oil grooves, and the "$4_L$"-type oil grooves, in a well-balanced manner, and further include the "$4_A$"-type oil grooves. Thus, it is considered that synergistic reduction of drag torque occurred, which has not been known yet.

In addition, the wet friction bodies of Examples 1 and 2 each had a remarkable reduction effect in a low rotation range of 500 rpm to 1000 rpm, and the wet friction body of Example 2 was particularly excellent in this effect. This is probably because discharging efficiency of lubricating oil in the low rotation range was improved.

Further, the wet friction bodies of Examples 1 and 2 each showed no increase in drag torque at 1000 rpm with respect to the drag torque at 500 rpm, and achieved gently reduction of the drag torque in all the rotation ranges.

The present invention is not limited to the specific examples described above, and can be variously modified within the scope of the present invention depending on purpose and use.

Industrial Applicability

Uses of the wet friction body of the present invention are not particularly limited, and it is widely applied in automobiles (four-wheeled automobiles, two-wheeled automobiles, etc.), railway vehicles, ships, airplanes, and the like, for example. Among them, the wet friction body is suitably used for an automatic transmission (AT) as automobile supplies. While only one sheet of the present wet friction body may be used in the transmission, or a plurality of sheets of the wet friction body may be used, it is preferable that the plurality of sheets of the wet friction body is used. When the number of the present wet friction bodies used in one transmission increases, a large effect can be cumulatively obtained. That is, the drag torque can be more effectively reduced in a wet multiple disc clutch using a large number of the wet friction bodies.

REFERENCE SIGNS LIST

1: wet friction body
2: core plate, 2a: main surface
3: friction part
3A: first friction part, $3A_{WL}$: left sidewall, $3A_{WR}$: right sidewall, $3A_{WO}$: outer peripheral wall, $3A_{WI}$: inner peripheral wall
3B: second friction part, $3B_{WL}$: left sidewall, $3B_{WR}$: right sidewall, $3B_{WO}$: outer peripheral wall, $3B_{WI}$: inner peripheral wall
3C: third friction part, $3C_{WL}$: left sidewall, $3C_{WR}$: right sidewall, $3C_{WO}$: outer peripheral wall, $3C_{WI}$: inner peripheral wall
4, 4L, 4R, $4_V$, $4_A$: oil groove
8: spline internal teeth
$P_0$: rotation center
$P_A$: center of gravity of first friction part
$P_B$: center of gravity of second friction part
$P_C$: center of gravity of third friction part
$L_A$: imaginary line segment connecting $P_A$ to $P_0$
$L_B$: imaginary line segment connecting $P_B$ and $P_0$
$L_C$: imaginary line segment connecting $P_C$ and $P_0$

The invention claimed is:

1. A wet friction body comprising:
a core plate in a flat ring shape with a center serving as a rotation center;
a plurality of friction parts disposed at intervals in a ring shape on a main surface of the core plate; and
a plurality of oil grooves defined by the corresponding friction parts as the respective intervals,
in plan view, the friction parts each including:
a pair of sidewalls composed of a left sidewall defining an oil groove positioned on a left side of the friction part and a right sidewall defining an oil groove positioned on a right side of the friction part;
an outer peripheral wall connecting the pair of sidewalls on an outer peripheral side thereof; and
an inner peripheral wall connecting the pair of sidewalls on an inner peripheral side thereof, the friction parts include a first friction part, a second friction part, and a third friction part disposed in order in a circumferential direction of the core plate, forms of the pair of sidewalls being different from each other in the plan view, the first friction part including a first left sidewall, a first right sidewall, a first outer peripheral wall, and a first inner peripheral wall, the first left sidewall inclining to the right and first right sidewall inclining to the left, each with respect to a first imaginary line segment connecting a first center of gravity to the rotation center, and first outer peripheral wall has a length less than a length of the first inner peripheral wall, the second friction part including a second pair of sidewalls, both inclining to the right with respect to a second imaginary line segment connecting a second center of gravity to the rotation center, and the third friction part including a third pair of sidewalls, both inclining to the left with respect to a third imaginary line segment connecting a third center of gravity to the rotation center.

2. The wet friction body according to claim 1, wherein expressions (1) and (2) below are satisfied, $$N3A < N3B \ldots (1)$$

$$N3A < N3C \ldots (2)$$

where N3A is the number of the first friction parts disposed on the main surface of the core plate, N3B is the number of the second friction parts disposed thereon, and N3C is the number of the third friction parts disposed thereon.

3. The wet friction body according to claim 1, wherein the first friction parts, the second friction parts, and the third friction parts are disposed such that the friction parts of an identical type are not adjacent to each other.

4. The wet friction body according to claim 1, further comprising:

three sets of the friction parts disposed in order of the second friction part, the first friction part, and the third friction part in a circumferential direction of the core plate.

5. The wet friction body according to claim 1, further comprising:

five sets of the friction parts disposed in an order of the third friction part, the second friction part, the first friction part, the third friction part, and the second friction part in a circumferential direction of the core plate.

6. The wet friction body according to claim 1, further comprising at least one of:

three sets of the friction parts disposed in an order of the second friction part, the third friction part, and the second friction part in a circumferential direction of the core plate; and three sets of the friction parts disposed in an order of the third friction part, the second friction part, and the third friction part in a circumferential direction of the core plate.

* * * * *